E. R. LOCHMAN.
CARVING MACHINE.
APPLICATION FILED OCT. 14, 1905.
1,138,126.
Patented May 4, 1915.
13 SHEETS—SHEET 1.
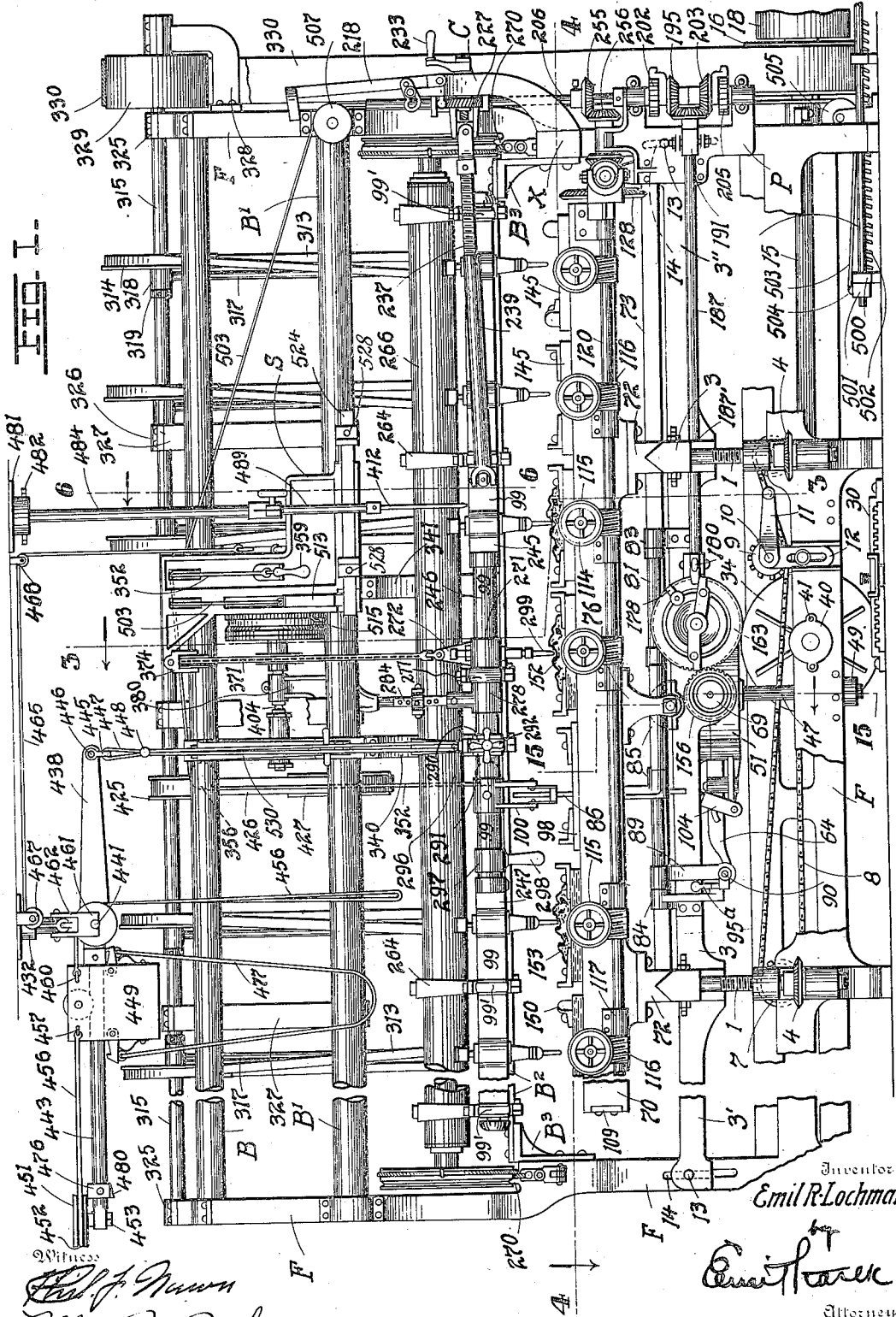

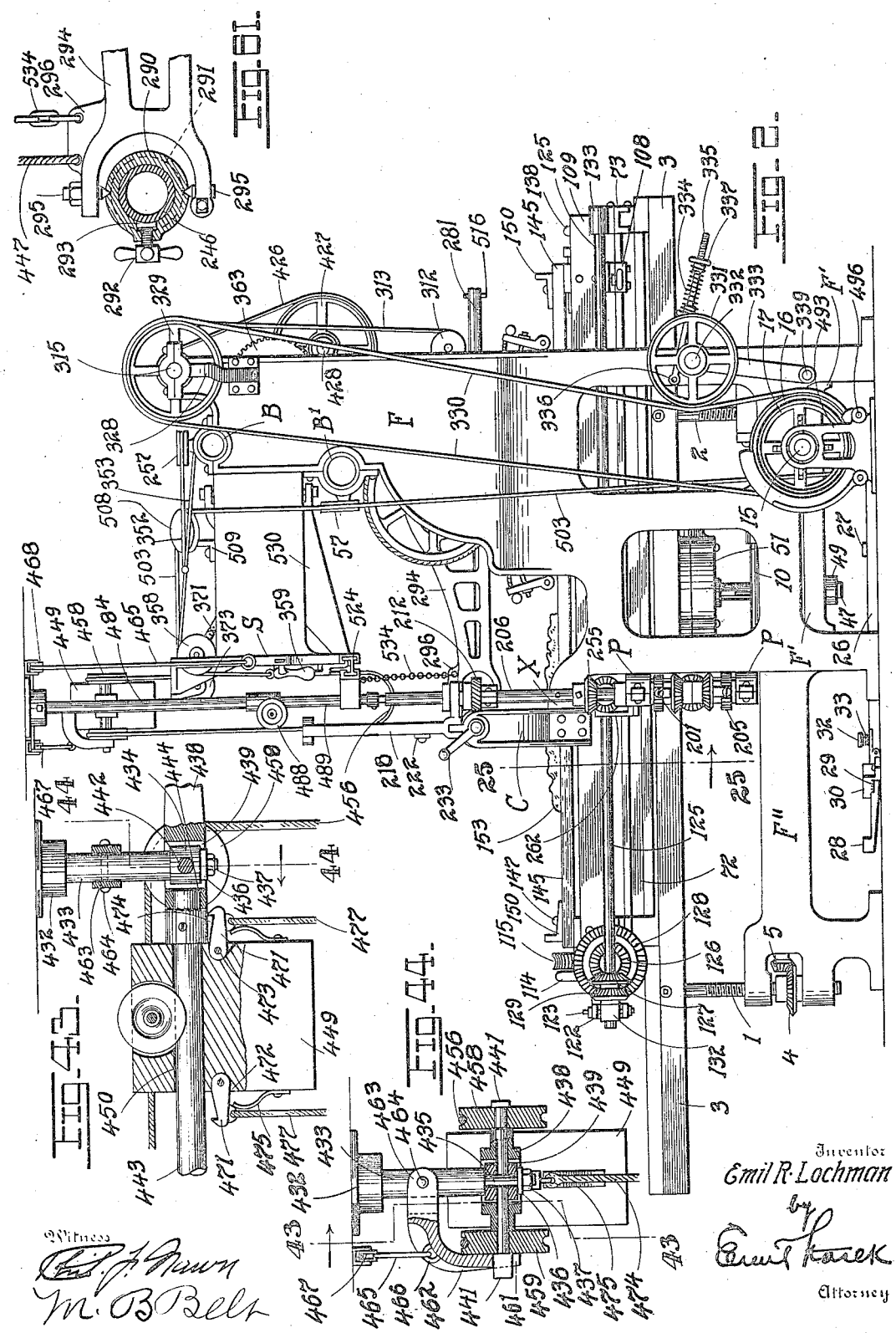

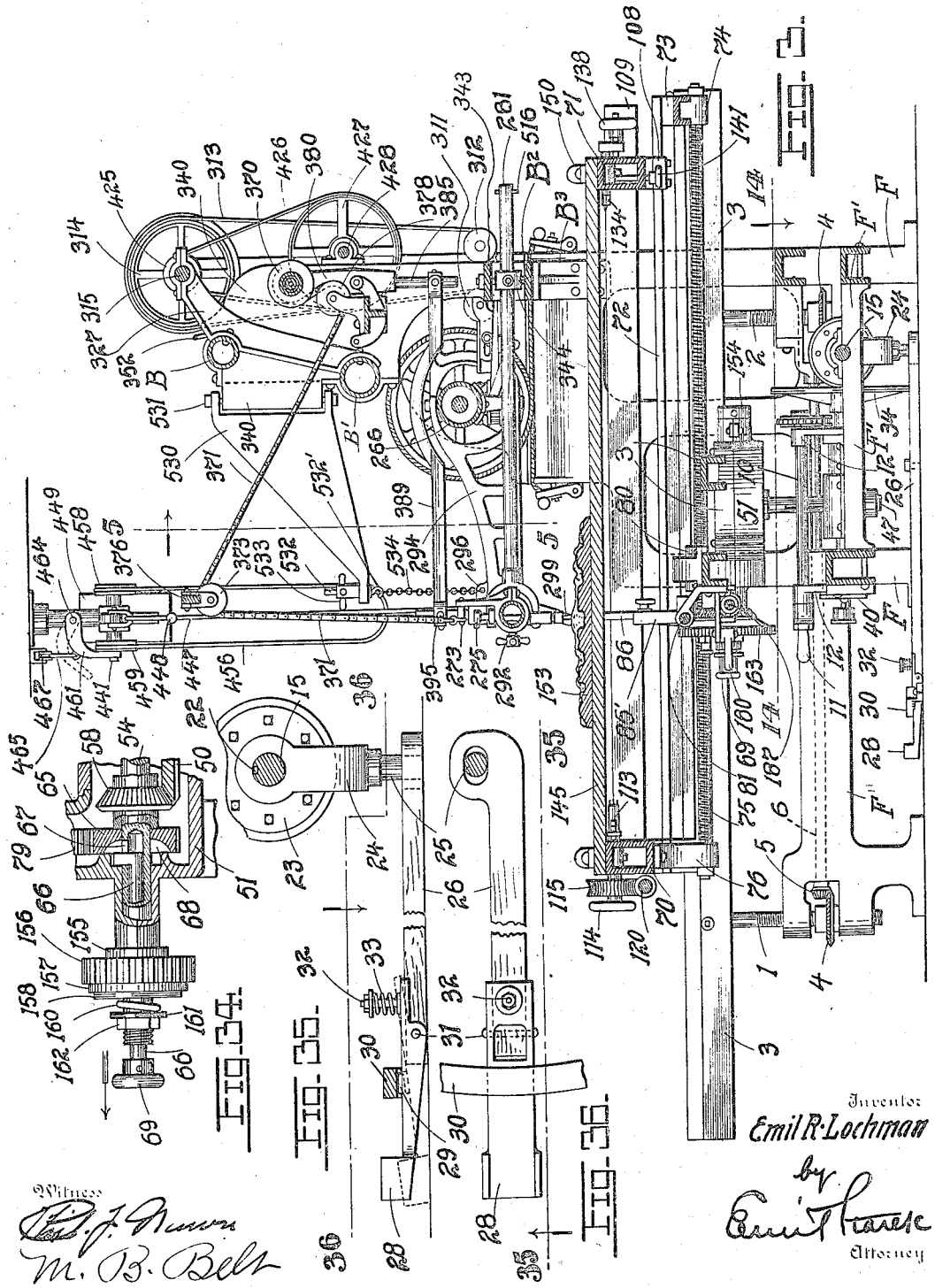

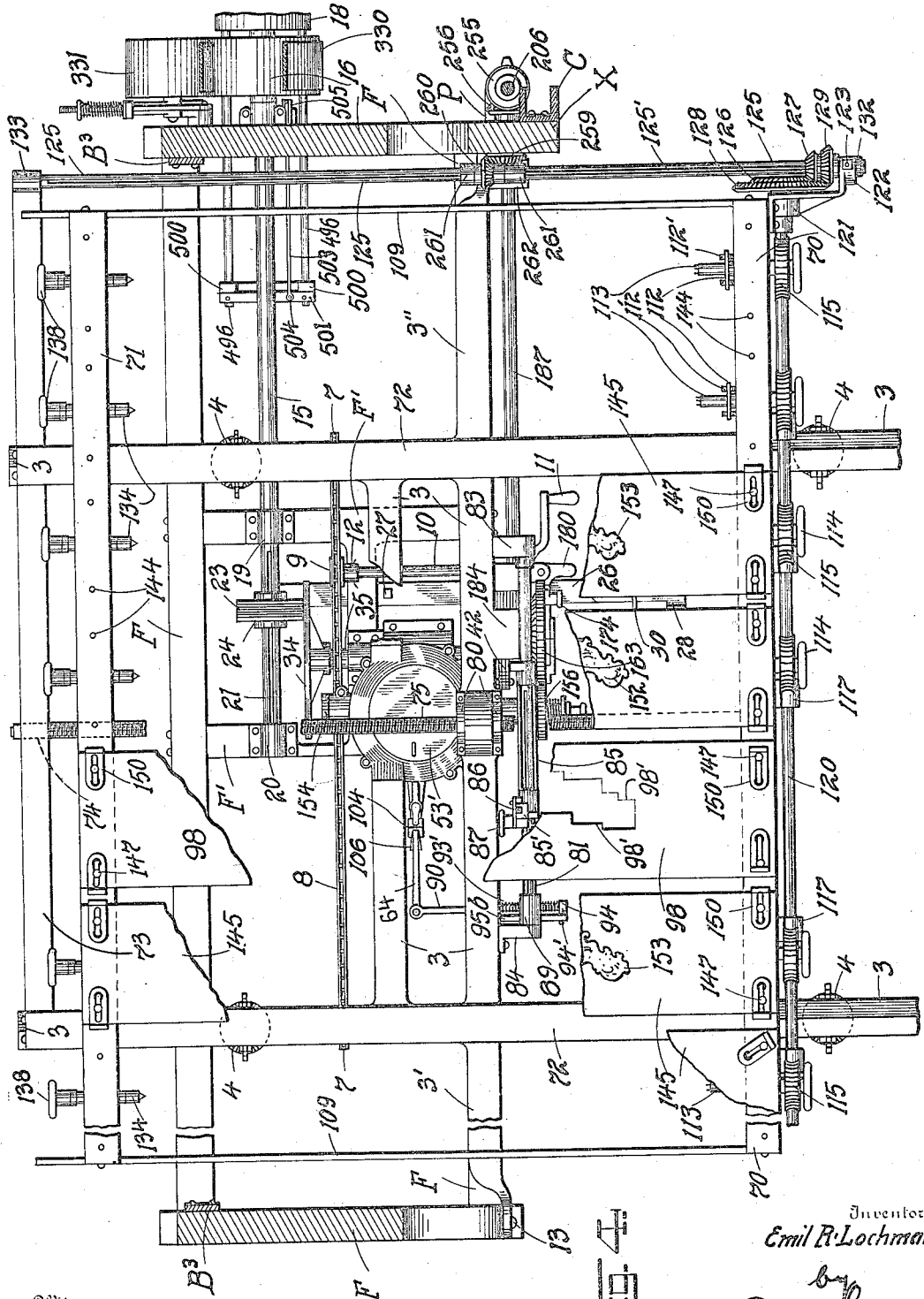

E. R. LOCHMAN.
CARVING MACHINE.
APPLICATION FILED OCT. 14, 1905.
1,138,126.
Patented May 4, 1915.
13 SHEETS—SHEET 5.
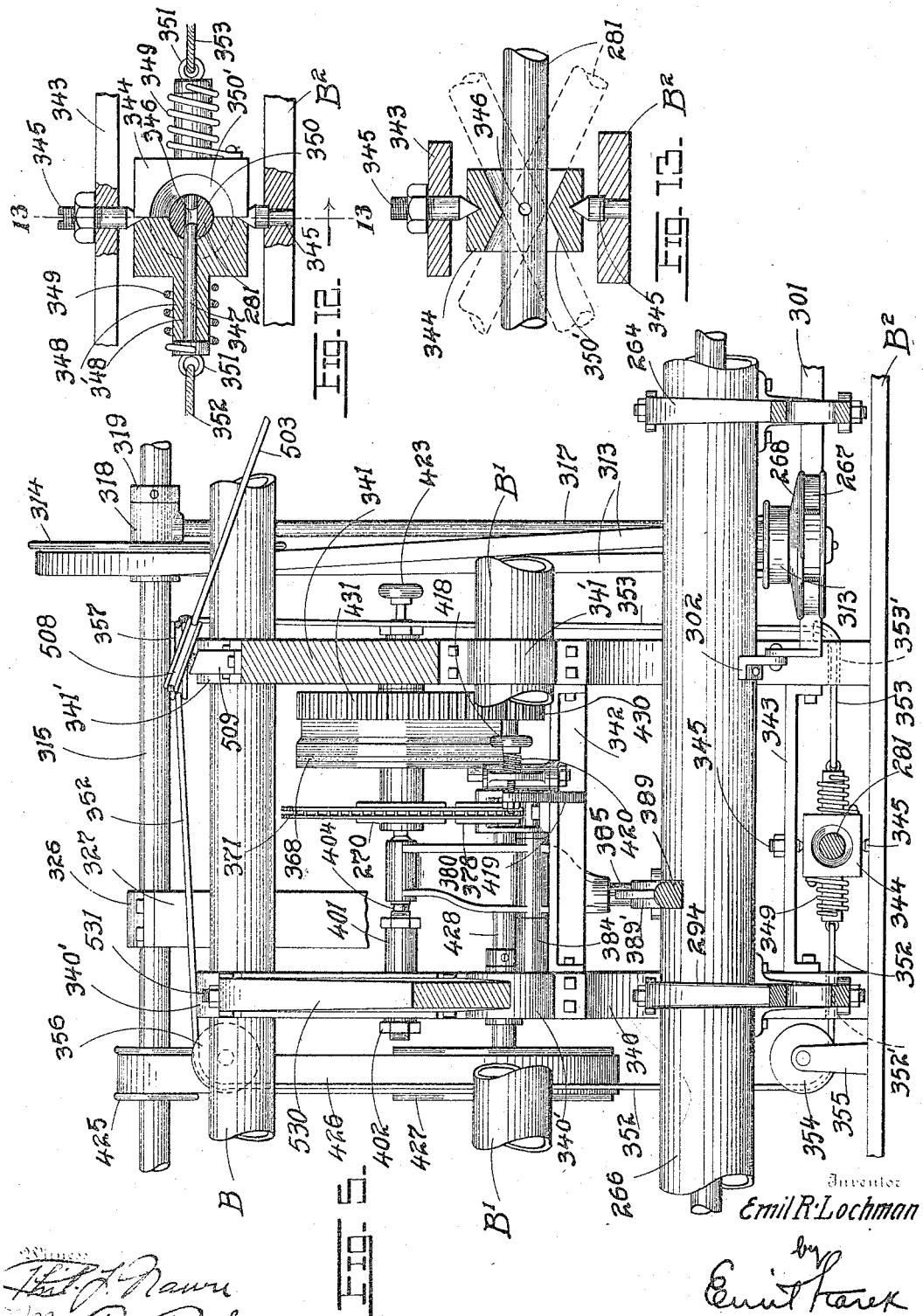
Inventor
Emil R. Lochman E. R. LOCHMAN.
CARVING MACHINE.
APPLICATION FILED OCT. 14, 1905.
1,138,126.
Patented May 4, 1915.
13 SHEETS—SHEET 6.
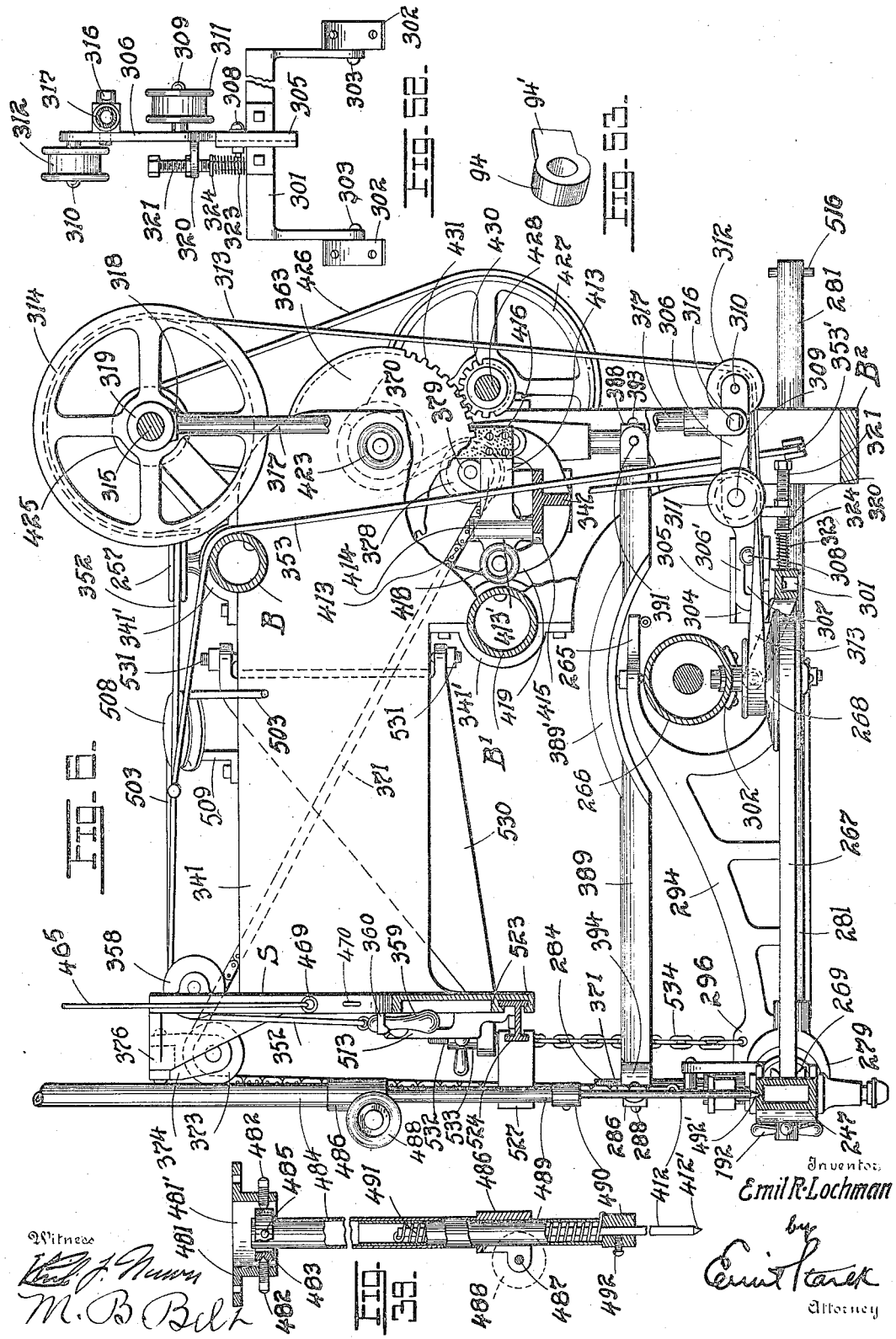

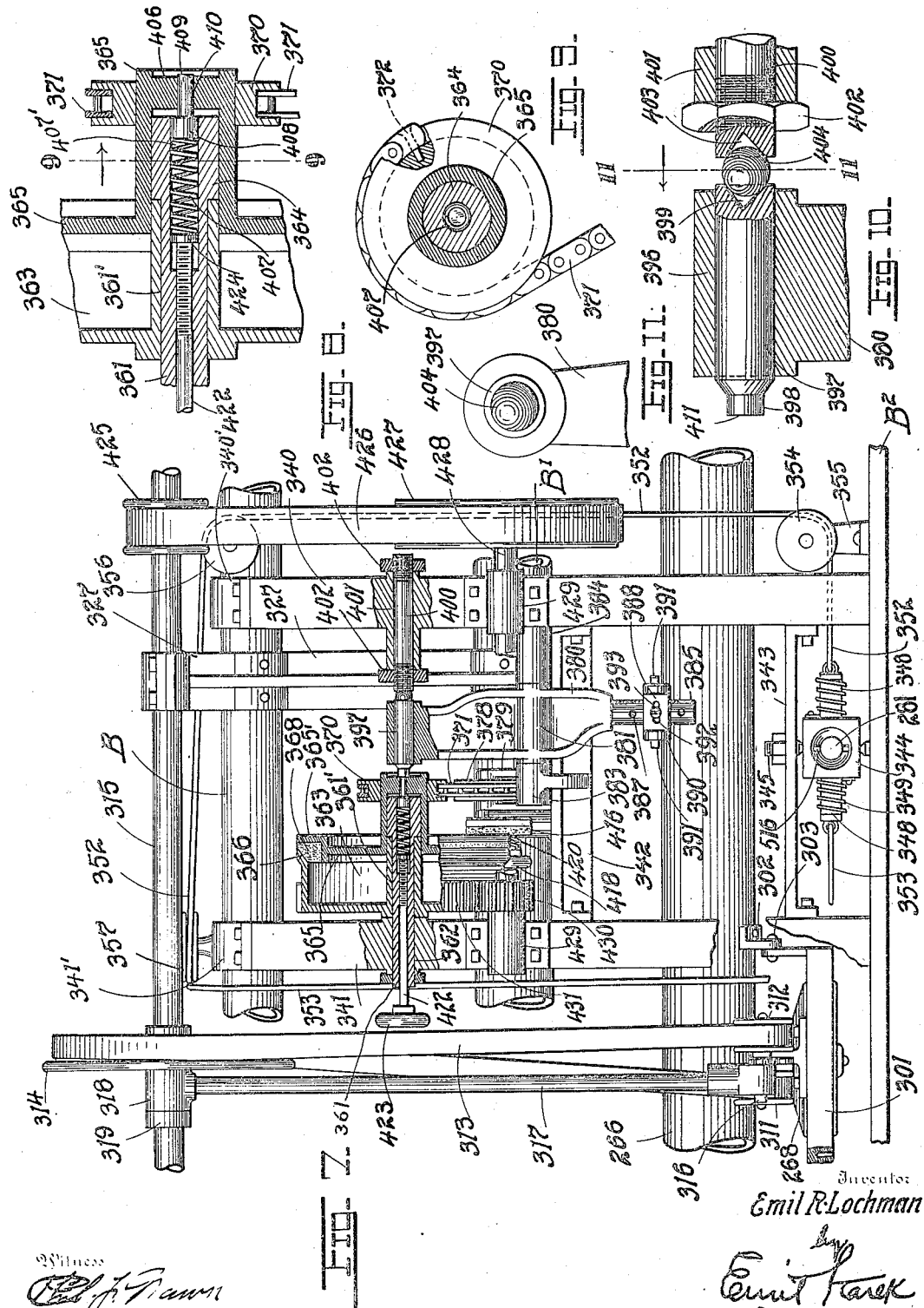

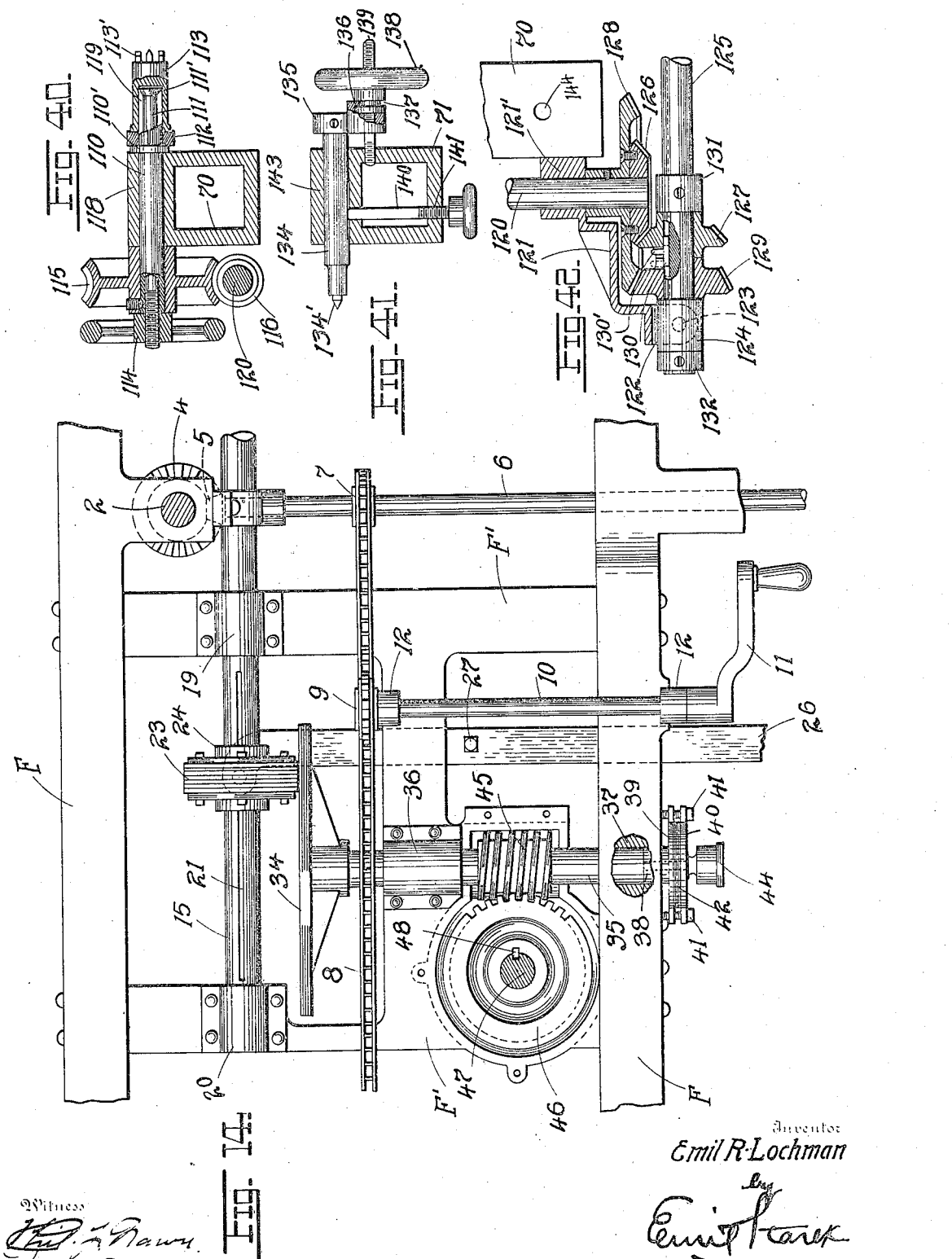

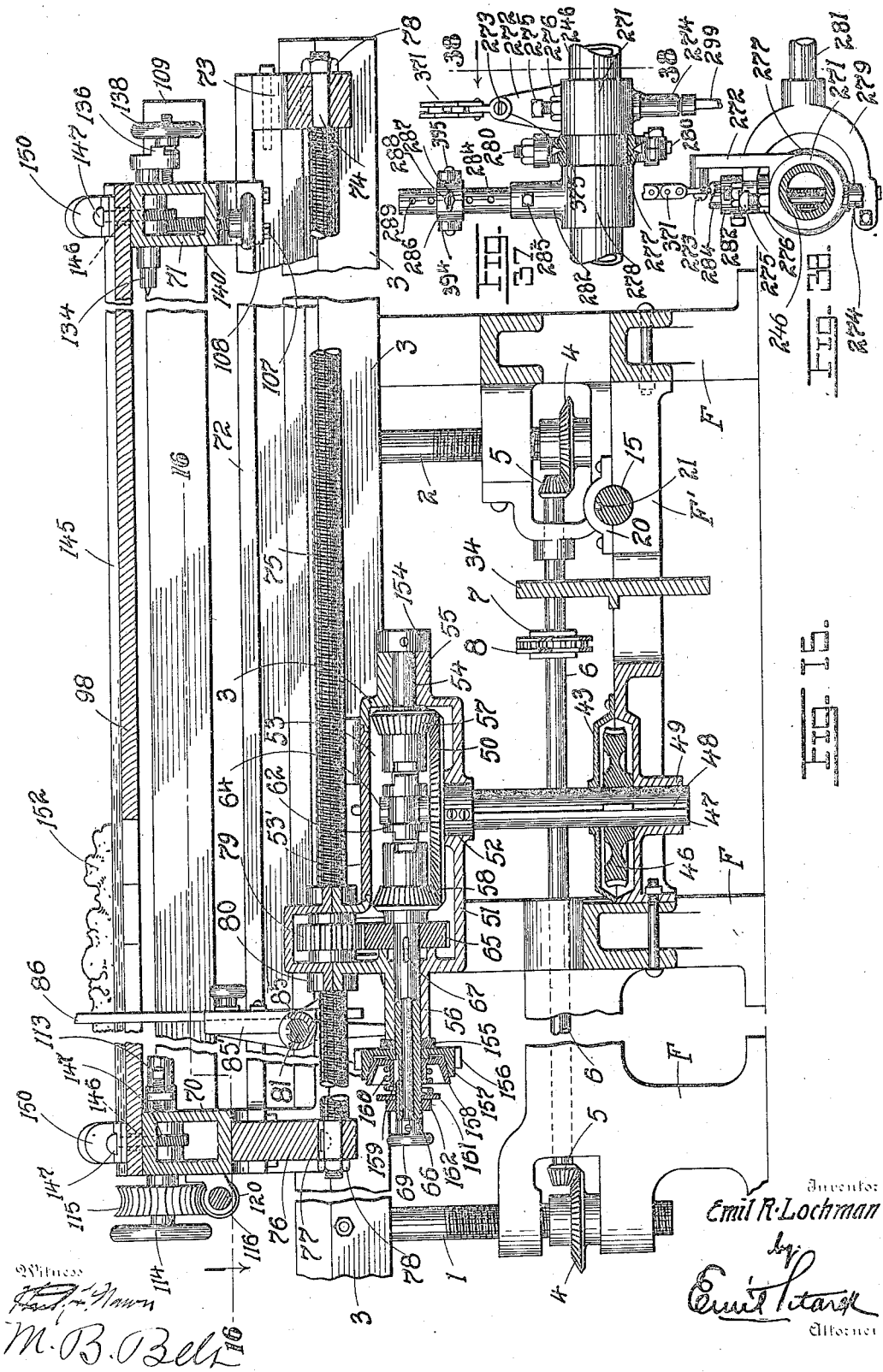

E. R. LOCHMAN.
CARVING MACHINE.
APPLICATION FILED OCT. 14, 1905.
1,138,126.
Patented May 4, 1915.
13 SHEETS—SHEET 10.
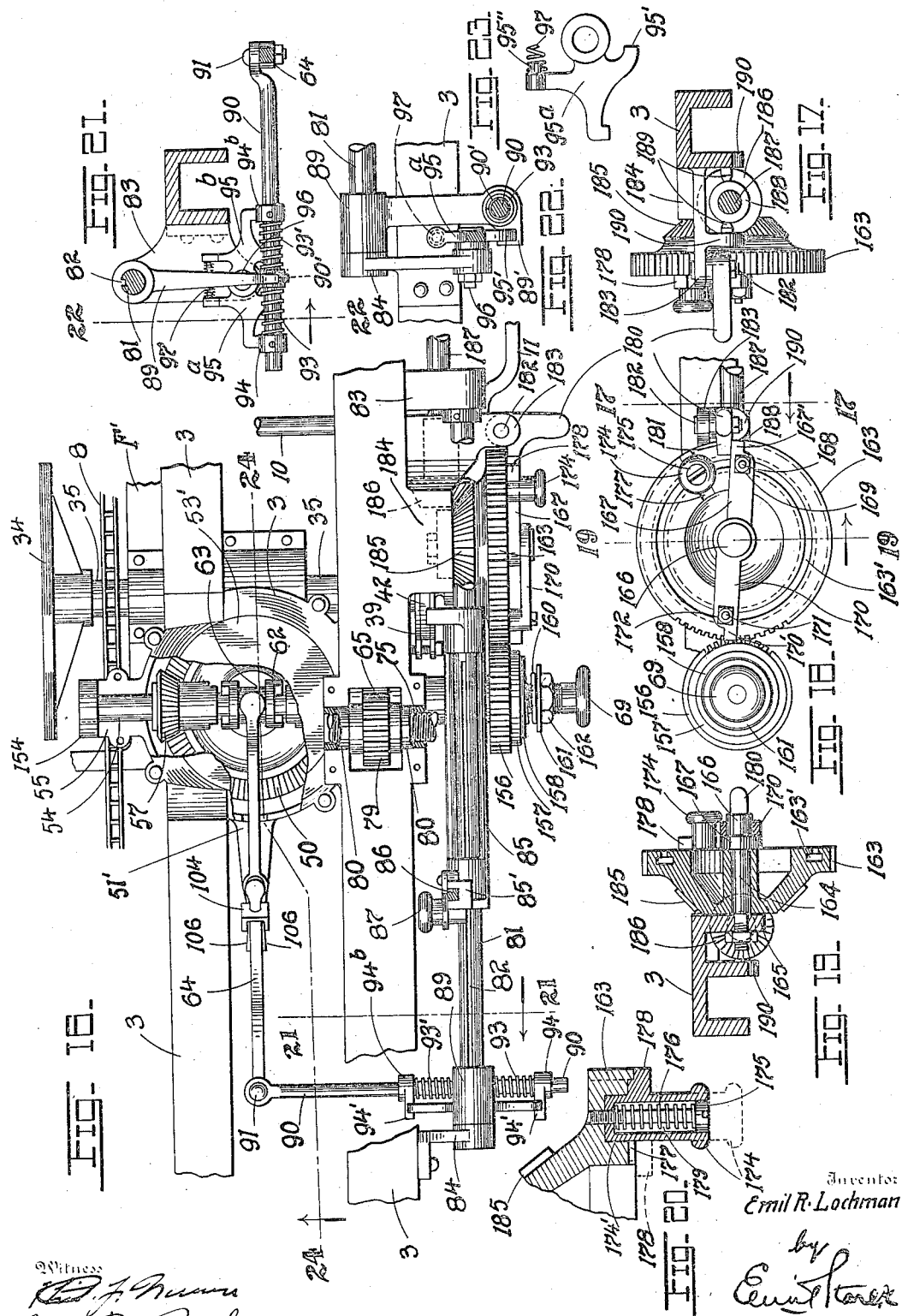
Inventor
Emil R. Lochman

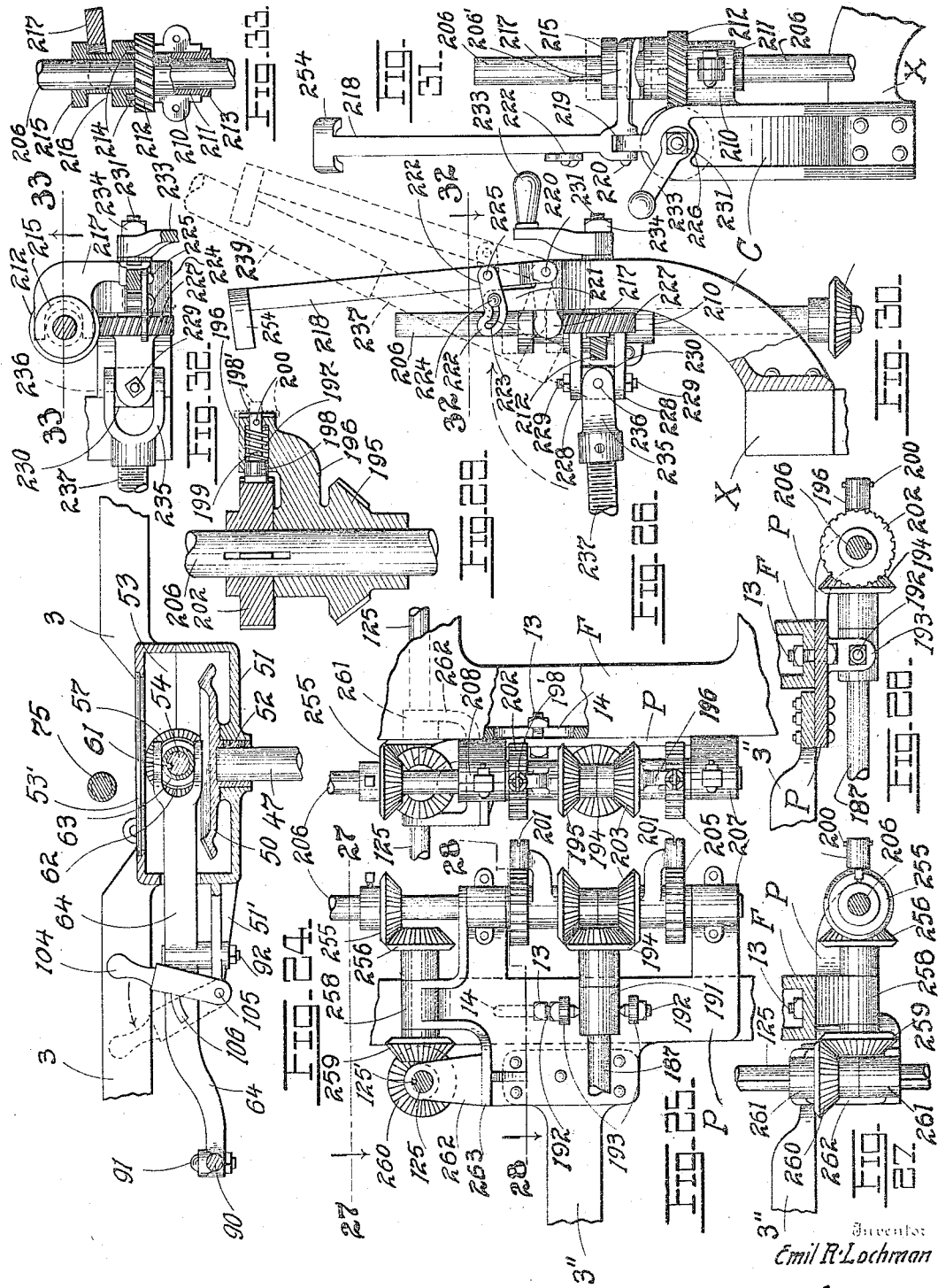

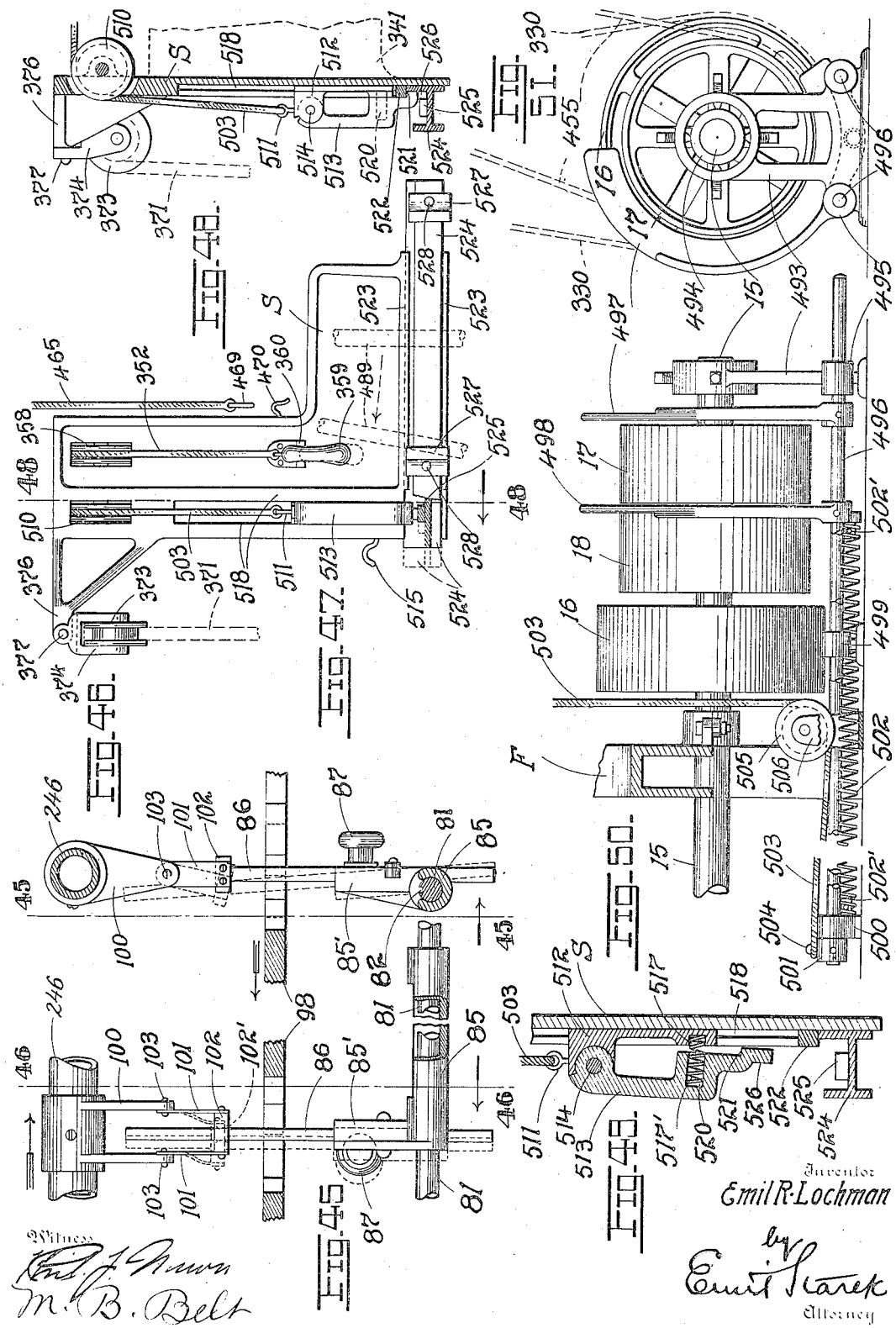

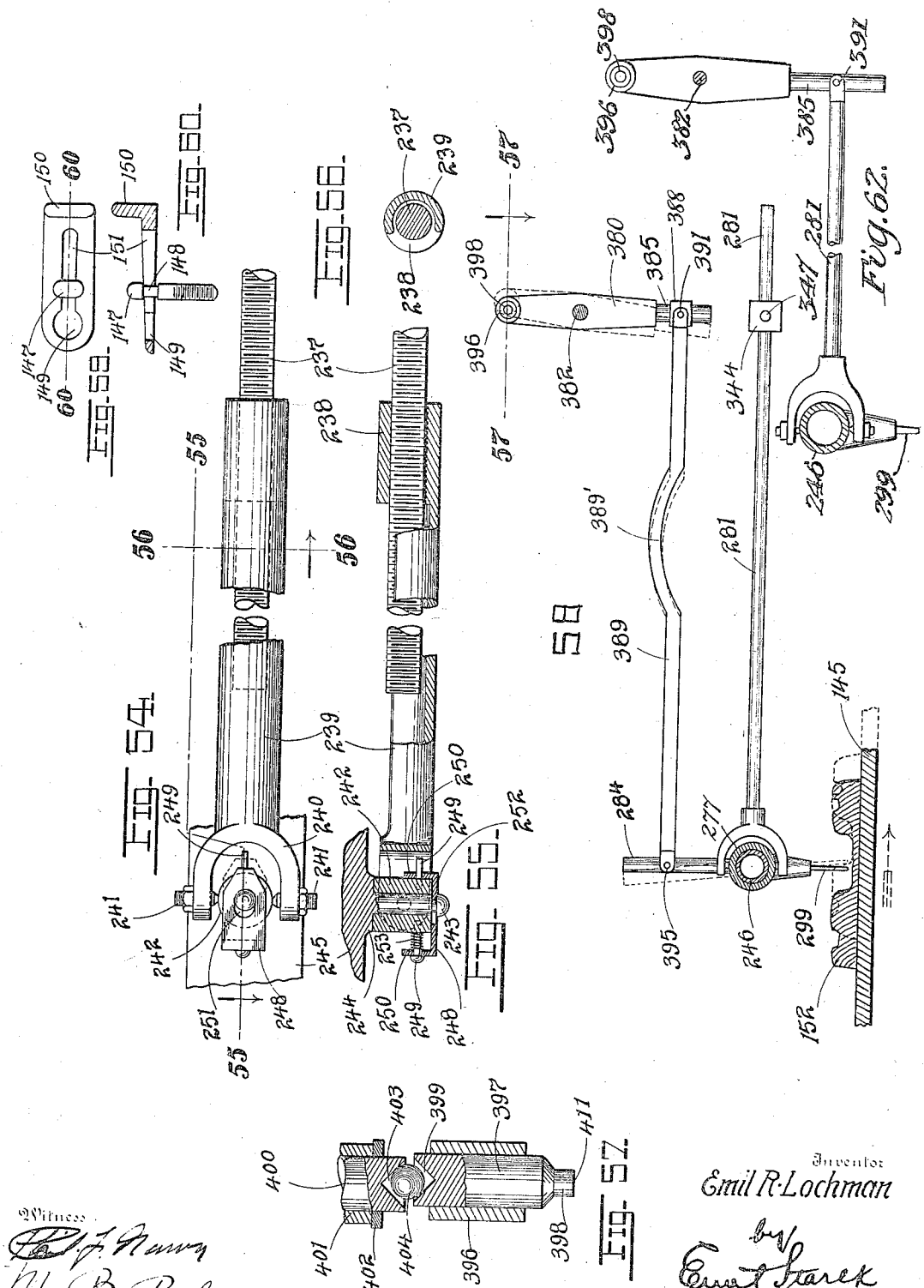

UNITED STATES PATENT OFFICE.

EMIL R. LOCHMAN, OF ST. LOUIS, MISSOURI.

CARVING-MACHINE.

1,138,126.  Specification of Letters Patent.  Patented May 4, 1915.

Application filed October 14, 1905. Serial No. 282,854.

*To all whom it may concern:*

Be it known that I, EMIL R. LOCHMAN, citizen of the United States, residing at St. Louis, State of Missouri, have invented certain new and useful Improvements in Carving-Machines, of which the following is a full, clear, and exact description, reference being had to the accompanying drawings, forming a part hereof.

My invention has relation to improvements in automatic carving machines and consists in the novel arrangement of parts more fully set forth in the specification and pointed out in the claims.

My invention has reference to a combined automatic and hand carving machine, and the particular objects of my invention are to apply new and original features, to produce a perfect machine which shall combine in one construction the essential features of both automatic and hand carving machines with particular view that the changes from automatic to hand operation and the reverse are made quickly and easily; furthermore to overcome the obstacles met with in automatic as well as hand carving machines so far known, and to produce a machine where the automatic action of the machine will not only "rough out," but also finish the work, so that only very fine contours and small details have to be gone over by hand operation of the tools.

One of the principal features of an automatic carving machine is a lifting or retracting device, to lift the tracer and tools over any projecting edges or obstructions of the pattern, which may strike the tracer during the travel of the pattern past the tracer. The retracting devices so far known were applied directly to the tracer or tool bar, but owing to wrong principles and faults of construction these machines could only be used for "roughing out" the work, the principal fault being that it would take too long for the retracting device to act. The pattern would then be jammed tight against the tracer until finally the retracting device would suddenly jerk the tracer out and the momentum thereby imparted to the tracer and tools would cause them to leap or jump over and miss certain parts of the pattern and work, and then the said tracer and tools would suddenly drop back onto the pattern and work, thereby breaking off certain pieces and details of the work and also damaging the pattern.

To overcome these difficulties I have provided devices whereby the retracting mechanism is regulated and controlled by an adjustable spring, thus making the device exceedingly sensitive.

I have furthermore separated the retracting device entirely from the tracer or tool bar and have incorporated the same into the upper frame-work of the machine, so that this device can be made as large and powerful as possible without interfering with the tracer or tool bar.

I have also provided a pressure rod and flexible transmitter between the retracting device and the tracer and tools, so that the latter may be operated freely in a horizontal and vertical direction entirely independent of the retracting device.

Among other advantages, I gain a much greater vertical travel for the tools through my arrangement, thus allowing for much deeper cutting.

To operate by hand on long stock, on carving machines with horizontal tables, required the operator to bend and reach over the front edge of the table until he almost lay flat on the work, thus losing control over the tools and consequently losing much time. To overcome this difficulty I have made arrangements so that the operator can get in between the pattern and the nearest piece of work, preferably the piece to the left of the pattern, so that he can practically walk in between the pattern and work and always have his tools under perfect control. The outline of carvings vary a great deal, only a very small percentage being square or rectangular, while most of them have all kinds of shapes, and if they are laid between parallel lines marking off their extreme width and length, perhaps less than half of that space would be covered by the carving itself, yet all existing automatic machines with automatically driven reciprocating work-holders go over the entire space in order to reach all points of the ornament, and consequently lose all the time they are running over empty space. To overcome this difficulty I have provided a reversing device for the table of the machine, where the length of the stroke is varied according to the outline of the pattern so that no time is lost by the machine, running over empty space.

Among the further objects of my invention may be classed (1) a variable speed drive for the table, with special provisions for quick adjustment, and a device to gain a constant pressure between the disk and the friction wheel forming the principal features of the variable drive; (2) a vertically adjustable frame with long bars or rails to form a bed for the reciprocating table of the machine; (3) a reversing device controlled by a stroke pattern to vary the length of the stroke of the reciprocating table of the machine according to the outline of the work, so that the tools will not run over empty space; (4) a combined and adjustable ratchet feed mechanism to gradually feed the tools transversely over the work, or to feed or revolve the work past the tools as in the case of stock held in centers which is being cut on more than one side; (5) a feed adjusting wheel coupled with said ratchet-feed with special devices for a coarse feed for roughing, and a fine feed for finishing the work; (6) special devices to quickly transform the intermittent ratchet-feed into a continuous feed; (7) special devices to disconnect the feed mechanism of the table from the feed mechanism of the tools; (8) a safety stop for both feed mechanism of table and tools; (9) a special arrangement coupling the entire feed mechanism of the table and the feed-mechanism for the tools or stock with the vertically adjustable bed, so that the machine may be adjusted to any thickness of stock; (10) a highly sensitive and very powerful retracting device adapted to be geared, and controlled by an adjustable spring; (11) a flexible transmitter and connecting rod between said retracting device and the tool bar; (12) special devices to lock the tool carriage against horizontal motion upon its tracks during the automatic motion of the machine; (13) special devices to transmit the pressure of the pattern against the tracer to the retracting device, said devices being adapted to allow the tools to be fed transversely over the stock, and also allow a vertical motion of said tracer and tools to a much greater extent than is possible with the known machines; (14) a special counter-balance for the tool-carriage with adjustable weight and special devices to hold said weight in either adjusted position, so that in one position of the weight, the tool carriage is allowed to press the tracer and tools into firm contact with the pattern and stock, while in the other position said weight will fully counter-balance the tool carriage; (15) a special pressure bar with an adjustable extension-spring to assist in pressing and keeping the tracer and tools in firm contact with the pattern and stock and at the same time counteracting against the momentum of the tool-bar in its upward motion; (16) special devices for an automatic stop of the machine, the aforesaid pressure bar acting in conjunction with said device; (17) a special part or plate carrying the controlling features of the automatic stop as well as other switching devices, thereby concentrating them handy for the operator of the machine; (18) a special device to hold the connecting arm of the ratchet-feed to the tool bar in position when said arm is disconnected from the tool bar during the time the machine is used for hand operation, said device automatically disconnecting the feed motion of the ratchets to said connecting arm; (19) a special device to limit the downward or vertical motion of the tools and tracer; (20) a new and novel disposition of belts generally; (21) special devices for taking up the slack of each individual belt, leading from the drive shaft for all the tools, to the step-pulley for each tool mounted on the tube or pipe forming the rear part of the tool carriage; and (22) other details of construction and design imparting advantages which will fully appear from a detailed description of the invention which is as follows:

In the drawings, Figure 1 Sheet 1 is a front elevation of the machine broken on the left side, leaving out one spindle and cutting tool; on the lower part of the right hand side the counter-shaft is broken away, and other parts broken away to bring out the details of construction more clearly; Fig. 2 Sheet 2 is a side elevation of the machine; Fig. 3 Sheet 3 is a vertical section of the machine on line 3—3 of Fig. 1 showing the variable drive for the stock frame, the general arrangement of the latter, and all the principal features of the retracting device in the upper part of the machine; Fig. 4 Sheet 4 is a horizontal section on line 4—4 of Fig. 1 showing the stock frame with stock boards and stroke pattern broken, to leave a top plan of the entire driving mechanism for the table, the reverse device for the same, and parts of the feed device for the tools and centers; Fig. 5 Sheet 5 is a section on line 5—5 of Fig. 3 showing the retracting device, the lock for the connecting bar of the tool-carriage and one of the belts leading from the main drive-shaft to the step-pulley on the tool carriage for driving the tools; Fig. 6 Sheet 6 is a section on line 6—6 of Fig. 1 showing a side view of the parts shown in Fig. 5, the connecting parts between the retracting device and the tool-bar, and relative parts; Fig. 7 Sheet 7 is a rear elevation of the parts shown in Fig. 5 with parts broken away to give a sectional view of the friction clutch and relating parts of the retracting device; Fig. 8 Sheet 7 is a middle longitudinal section of the friction clutch of the retracting device with parts broken away; Fig. 9 Sheet 7 is a section on line 9—9 of Fig. 8; Fig. 10 Sheet 7 is a middle longitudinal section of the stationary and movable countersunk bolts, and ball interposed between them of the retracting device, bearings broken away; Fig. 11 Sheet 7 is a section on line 11—11 of Fig. 10; Fig. 12 Sheet 5 is a half plan and half sectional front elevation of the lock for the truss-bar to lock the tool carriage; Fig. 13 Sheet 5 is a section on line 13—13 of Fig. 12; Fig. 14 Sheet 8 is a top plan view of the variable-speed drive for the stock frame, showing worm and worm-wheel connection for the driving gear of said stock-frame; Fig. 15 Sheet 9 is a section on line 15—15 of Fig. 1 showing a section of the stock-frame and the stroke pattern, part of the reversing device, the driving gear for the stock frame, the friction clutch attached to same used for driving the feed mechanism of the tools, and the mechanism for raising and lowering the stock frame; Fig. 16 Sheet 10 is an enlarged top view of the driving gear for the stock frame, the reverse-mechanism, and part of the feed mechanism for the tools or centers, showing their respective positions as they are mounted and carried by supporting frame, parts of the latter being broken away, to bring out the various details; Fig. 17 Sheet 10 is a section of Fig. 18 on line 17—17 showing a side view of the feed-adjusting gear; Fig. 18 Sheet 10 is a front elevation of said feed-adjusting-gear showing the connection with loose gear; Fig. 19 Sheet 10 is a section of feed-adjusting-gear; Fig. 20 Sheet 10 is a section of knob showing how it is mounted on feed-adjusting-gear; Fig. 21 Sheet 10 is a section on line 21—21 of Fig. 16 showing part of the reversing-mechanism for the stock frame; Fig. 22 Sheet 10 is a section on line 22—22 of Fig. 21; Fig. 23 Sheet 10 is a side view of the retaining hook; Fig. 24 Sheet 11 is a sectional view of the driving gear, gear-casing, and parts of the reversing mechanism; Fig. 25 Sheet 11 is a front elevation of plate carrying ratchet, pawls, etc. for the feed mechanism of the tools and centers; Fig. 26 Sheet 11 is a side view of Fig. 25; Fig. 27 Sheet 11 is a top view of Fig. 25; Fig. 28 Sheet 11 is a section on line 28—28 of Fig. 25; Fig. 29 Sheet 11 is a section of one of the loose pinions carrying the operating pawls; Fig. 30 Sheet 11 is a front elevation of a bracket carrying the upper part of the feed mechanism for the tools; Fig. 31 Sheet 11 is a side elevation of Fig. 30; Fig. 32 Sheet 11 is a section of Fig. 30 on line 32—32; Fig. 33 Sheet 11 is a section on line 33—33 of Fig. 32; Fig. 34 Sheet 3 is partly section partly side view, showing loose-gear disconnected, rod and handle pulled out, loose-gear and parts holding it in engagement with shaft being shown in side view; Fig. 35 Sheet 3 is a side elevation of friction disk 23 and foot lever (shown broken); Fig. 36 Sheet 3 is a section on line 36—36 of Fig. 35 showing a top view of foot lever; Fig. 37 Sheet 9 is a front elevation of the tracer casing and connecting parts carried by tube for the retracting device; Fig. 38 Sheet 9 is a section on line 38—38 of Fig. 37; Fig. 39 Sheet 6 is a sectional view of pressure rod showing its various parts, and flange for connecting same to the ceiling; Fig. 40 Sheet 8 is a sectional view of one of the head chucks for carrying the stock; Fig. 41 Sheet 8 is a sectional view of one of the tail stocks for carrying the stock; Fig. 42 Sheet 8 is a sectional view of double gear and bracket, also loose pinions forming part of the feed motion for the head-chucks; Fig. 43 Sheet 2 is a section on line 43—43 of Fig. 44 showing the counter-balance for the machine with parts broken away; Fig. 44 Sheet 2 is a section on line 44—44 of Fig. 43 showing the connection of the counter-balance to stud; Fig. 45 Sheet 12 is a front elevation of the connecting members of the tool bar and the reversing mechanism for the stock frame, with parts broken away, and a sectional view of the stroke pattern; Fig. 46 Sheet 12 is a section on line 46—46 of Fig. 45; Fig. 47 Sheet 12 is a front elevation of the shifter plate carrying various parts to operate the belt shifter, and parts for changing the machine for automatic or hand operation; Fig. 48 Sheet 12 is a section on line 48—48 of Fig. 47; Fig. 49 Sheet 12 is a section of handle and the various parts coöperating therewith for operating the belt shifter, showing position when the machine is stopped; Fig. 50 Sheet 12 is a front elevation of the tight and loose pulleys, and shifter arrangement for the machine, showing the belt shifter fork on the tight pulley and spring expanded; Fig. 51 Sheet 12 is a side elevation of said pulleys and shifter; Fig. 52 Sheet 6 is a top plan of one of the carriers and bracket showing the arrangement of the idlers for belt; Fig. 53 Sheet 6 is a perspective view of one of the collars for rod of the reverse mechanism; Fig. 54 Sheet 13 is a front elevation of connecting arm with parts broken away, also showing a section of tool bar and the arrangement whereby said connecting arm is pivoted and locked to said tool-bar; Fig. 55 Sheet 13 is a section on line 55—55 of Fig. 54 with parts broken away to show the feed screw; Fig. 56 Sheet 13 is a section on line 56—56 of Fig. 54; Fig. 57 Sheet 13 is a section on line 57—57 of Fig. 58 Sheet 13 showing the ball forced out of the counter-sunks (exaggerated position) whereby the retracting device is set in motion; and Fig. 58 is a diagram (side view) of the connecting members between the tool bar and the retracting device, to transmit the pressure exerted by the pattern against the tracer, to the retracting device, said action being shown in exaggerated position in dotted lines. Fig. 59 Sheet 13 is a top plan of one of the bolts and wedges to hold the stock-boards on the stock-frame; Fig. 60 Sheet 13 is a section on line 60—60 of Fig. 59. Fig. 61 Sheet 2 is a vertical section of ring 290 showing hand screw 292, brake-block 293, and a side view of the front-fork of arm 294 other parts broken away.

Referring to the drawings, F represents a suitable supporting frame, F' a part interposed between the lower members of said frame and forming part of it. B, B¹, and B² are braces or connecting members for the upper part of the frame, the brace B² being connected to the frame by brackets B³.

C is a bracket carried by the extension X at the right side of the frame of the machine, P is a plate located below the said extension X. S is a plate carrying a part of the shifter-mechanism, and mounted on a bracket 341, of the upper frame-work of the machine.

The stock frame of the machine is adjustable both vertically and horizontally as apparent from the following mechanism: The base of frame F has extensions in the front provided with bearings for adjusting screw-bolts 1, 1, said screw-bolts having right hand threads, the rear part of the base of the frame F being likewise provided with bearings for adjusting screw-bolts 2, 2, same having left hand threads. Each screw-bolt is provided at the bottom of the screw-threaded portion with a nut freely rotatable about said portion, and resting on the frame, the upper ends of the bolts being rigidly secured to the supporting-frame 3, said supporting-frame 3 forming the tracks for the stock frame, a support for the driving gear and reverse mechanism for same, further a support for the feed mechanism for the tools and centers, and a rigid connection with the frame of the machine through extensions 3' and 3''. The periphery of each nut of said screw bolts carries a bevel gear 4, a pinion 5 meshing with each bevel gear. Extending from front to rear and carried by suitable bearings on the frame of the machine are shafts 6, 6, each shaft carrying pinions 5, 5, at each end, and each connecting a right hand and a left-hand adjusting screw-bolt 1 and 2. The shafts 6, 6, carry sprocket wheels 7, 7, a sprocket chain 8 connecting said sprockets. A third sprocket 9 engages sprocket chain 8, said sprocket being carried at the rear end of shaft 10, the front end of said shaft being provided with a handle 11. Shaft 10 is carried by adjustable bearings 12, 12, same being adjusted to tighten sprocket chain 8. It is evident that turning handle 11 in one direction will raise the stock frame, and turning in reverse direction will lower the same. The foregoing arrangement has the advantage that the operator can adjust the height of the stock frame without leaving his place in front of the machine. Plate P is rigidly connected to and forms the outer part of the extension 3'' of supporting frame 3. Plate P and the outer part of extension 3' are screw-threaded and carry bolts 13, 13, said bolts extending through slots 14, 14, in the sides of frame F. After the stock frame is adjusted to its proper height said bolts 13, 13, are tightened to connect supporting-frame 3 firmly to the frame of the machine, to keep the former always rigid, and in perfect alinement.

Drive shaft 15 carrying tight pulleys 16 and 17 and loose pulley 18 enters the frame of the machine through a suitable bearing in the lower part of the right-hand side of the machine, said shaft 15 being further supported by bearings 19 and 20 of F'. Said shaft is provided with a groove 21. Key 22 of friction disk 23 engages said groove (see Fig. 35) said friction disk 23 being adapted to slide along shaft 15 between bearings 19 and 20. Friction disk 23 is held between suitable bearings of fork 24, said fork carrying a stud 25, the rear end of foot lever 26 engaging said stud. Bolt 27 fastened in the floor forms the pivot of foot lever 26. The front end of said lever 26 is provided with a shoe 28 having teeth 29 engaging with the teeth of segment 30 bolted to the floor (Figs. 35, 36). Pin 31 forms the pivot of shoe 28; stud 32 holds spiral spring 33 in constant engagement with the rear part of shoe 28, so that the front part of said shoe with teeth 29 is held in engagement with the teeth of segment 30. The foregoing arrangement is for the purpose of varying the speed of the stock frame, by adjusting friction disk 23 toward or away from the center of the driven disk 34 along shaft 15. The operator pressing his foot on the front end of lever 28, disconnects teeth 29 from teeth of segment 30; lever 26 is then free to be adjusted toward the right or left thereby increasing or decreasing the speed of the stock frame. If the proper speed is gained, then the operator releases his foot from shoe 28, and spring 33 acting on the rear part of shoe 28 brings said shoe in temporary engagement with the teeth of segment 30 to retain said speed, until it is changed again. Driven disk 34 is carried by the rear end of shaft 35 extending through bearing 36 of F' and bearing 37 in the front part of the frame of the machine (Fig. 14); a plug 38 enters bearing 37, said plug being provided with a flange 39; a second flange 40 is held by bolts 41, 41, to the frame, a disk 42 of rubber or other elastic material is interposed between the flanges 39 and 40. Bolts 41, 41 are tightened to press the flange 40 and plug 38 tightly against the end of shaft 35, disk 42 acting as a cushion to supply a constant elastic pressure for shaft 35 and driven disk 34 against friction disk 23, for the purpose of gaining more power and less wear on the friction disk 23. It may be stated that plug 38 is bored out through its center and supplied with a grease cup 44 to lubricate its bearing surface.

Worm 45 is carried by shaft 35 and meshing with worm-wheel 46 drives the vertical shaft 47 said shaft being provided with a groove 48 engaged by a feather carried by worm-wheel 46.

The frame part F′ is provided with bearing 49 for the vertical shaft 47, and forms the lower half of a casing for said worm 45 and worm-wheel 46 (Figs. 14 and 15). A cover 43 forms the upper half of said casing, said casing to be partly filled with oil to lubricate worm and worm-wheel.

Driving gear 50 is fastened to the upper end of vertical shaft 47; supporting frame 3 forms the upper half of a casing 53 for several gears coöperating with driving gear 50. An opening is left in top of said casing 53 (see Fig. 24) for oiling and ready inspection of said gears, said opening is covered with lid 53′. Part 51 forms the lower part of said casing with bearing 52 for the upper part of vertical shaft 47. 51′ is an arm extending to the left from the casing 51. Shaft 54 horizontally disposed and held in bearings 55 and 56 carries the loose pinions 57, 58; the part of the shaft 54 between said pinions has a groove 61 and carries the endwise movable clutch 62 having a feather engaging groove 61; a groove 63 is cut into clutch 62 for shifter 64, (see Fig. 24). Loose gear 65 is carried by shaft 54 and held in position between loose pinion 58 and the wall of casing 53. The front end of shaft 54 is bored out to receive rod 66 holding a key entering through slots 67 into the grooves 68, (see Fig. 34) of loose gear 65; rod 66 is provided with handle 69 so that the operator may engage or disengage loose gear 65 during the operation of the machine.

*The stock frame.*—The stock frame of the machine is principally made up of the front bar 70, rear bar 71 and the two connecting bars or runners 72, 72; cross bar 73 connects the two runners in the rear and is provided with bearing 74 for the stationary screw-spindle 75; the reduced front end of said spindle 75 is held by bracket 76 attached to front bar 70; a key 77 is used in the bearing of bracket 76 to keep the screw-spindle 75 from turning; the projecting ends of said screw-spindle are threaded and are provided with nuts 78, 78; said nuts may be adjusted so as to allow some end movement of the spindle 75 in its respective bearings. A nut 79 is passed over and engages screw-spindle 75, said nut forming a gear and a short sleeve at either side of it. Said sleeves are carried in bearings 80, 80 of supporting frame 3. Gear 65 engages the gear of nut 79 and turning it to the right or left will draw the screw-spindle 75 rearward or forward through said nut, thus imparting the reciprocating motion to the stock frame.

*The reversing mechanism.*—The reversing mechanism for the stock frame is composed of the following parts: Rock-shaft 81 provided with groove 82 is carried by brackets 83, 84 fastened to supporting frame 3; a long sleeve 85 is passed over rock shaft 81 and engages same through a feather extending into a slot 82; 85′ is an arm extending at right angles upward from the left end of sleeve 85 and forms part of it (see Fig. 45); 85′ is grooved and carries a square rod 86; said rod is vertically adjustable and is held in position by tightening hand screw 87; said rod is dropped below stroke pattern 98 after the automatic operation of the machine. Rigidly mounted on rock shaft 81 near bearing 84 is an arm 89; rod 90 passes through a suitable opening 90′ in the lower part of arm 89; said rod is provided with an eye and coupled by pivot 91 to shifter 64, said shifter being mounted on extension-arm 51′ of casing 51 by pivot 92 (see Fig. 24). Passed over rod 90, and located at either side of lever 89 are compression springs 93, 93′ and collars 94, 94ᵇ; said collars are provided with extending noses 94′ (see Fig. 53); said noses are alternately gripped by the retaining hooks 95ᵃ, 95ᵇ to hold shifter 64 in either adjusted position; each of the said retaining hooks has an upward projection, and stub 95″, compression spring 97 being passed over said stubs between said retaining hooks for the purpose of keeping the latter in constant engagement with noses 94′ of collars 94 (see Figs. 21, 22, 23); both retaining hooks 95ᵃ, 95ᵇ have a common pivot 96 mounted on an extension to bearing 84; said retaining hooks are provided with noses 95′ extending below said pivot 96 (best shown in Fig. 23).

*Stroke pattern.*—A stroke pattern 98 is carried by the stock frame, said stroke pattern being cut out according to the outline of the pattern, to be reproduced, to save the time of the tools running over empty space, a great objection met with before in all automatic carving machines. Said stroke pattern is cut out step-like in straight lines at right angles for the purpose of its proper operation which is as follows: (See Figs. 45, 46). The rod 86 extending through the stroke pattern forms a connection between the reversing device and the tool bar 99 through the following parts: U-shaped bracket 100; its arms extending downward, carry flat steel springs 101, 101 connected by pivots 103, 103; said springs are rigidly connected to and carry block 102 at their lower ends, said block having a suitable opening 102' for rod 86 to pass through.

Starting at either side of the pattern the tool bar is fed gradually across the same, during the constant reciprocating motion of the table. The length of each stroke is controlled as follows: To start the driving mechanism for the table, rod 86 is pushed rearwardly at the top taking with it block 102 through which it is inserted; said block swings on springs 101, 101 about pivots 103, 103; this swings lever 89 forward at its lower end, by means of rod 90 and shifter 64, this will couple clutch 62 with pinion 57, thereby imparting a forward motion to the stock frame, through the connection of gear 65 and nut 79 engaging screw-spindle 75. The retaining hook 95$^b$ keeps rod 90, shifter 64 and clutch 62 in this position by engaging the nose 94' of collar 94$^b$, the forward motion of the stock-frame continuing until rod 86 strikes one of the square offsets of the stroke pattern 98; this pushes said rod 86 forward as shown in dotted lines in Fig. 46, and the lower end of the lever 89 to the rear (retaining hook 95$^b$ still holding the parts mentioned before in position). It is evident that the coil spring 93' interposed between lever 89 and collar 94$^b$ on rod 90 must be and is compressed until nose 89' of lever 89 engages nose 95' of retaining hook 95$^b$ thereby imparting an upward tilting motion to said retaining hook about the pivot 96, the compression of said spring continuing until said retaining hook 95$^b$ is lifted clear out of engagement with flange 94' of collar 94$^b$. At that moment the compressed coil spring 93' is released and exerts its pressure by pushing rod 90 rearward, thereby releasing clutch 62 from pinion 57 and engaging same with pinion 58 through shifter 64. Coil spring 97 with its constant pressure against the retaining hooks now presses retaining hook 95$^a$ into engagement with the flange 94' of collar 94, holding the shifter and various parts in position during the rearward stroke of the stock frame, until the above described motion of the various parts of the reversing device is again reversed.

For the purpose of clearer illustration clutch 62, as well as hooks 95$^a$, 95$^b$ are shown out of engagement. To start the feed motion of the stock-frame, rod 90 is pushed backward until hook 95$^a$ engages nose 94', of collar 94, this connects clutch 62 with pinion 58 and starts the feed motion of the stock-frame as herein before described.

When during the lateral feed motion of the tool bar the rod 86 strikes one of the offsets 98' of the stroke-pattern 98 and the tool bar is fed still more sidewise, then the springs 101, 101, bend as shown in dotted lines in Fig. 45, and remain in that position until the next step or recess of the stroke-pattern is reached, during the reciprocating motion of the stock-frame, then said springs straighten out and rod 86 snaps into the new offset, thereby shifting sleeve 85 along shaft 81, and the stroke is now controlled in its length by the last reached offset of the stroke pattern.

In case the operator wishes to stop the motion of the stock-frame quickly a hand lever 104 is provided, being connected by pivot 105 to the outer end of arm 51' of casing 51. The shifter 64 has crescent-shaped wedge-like projections 106 on either side, similar projections being provided for the inner sides of the arms of hand lever 104 embracing shifter 64, the thicker parts of the wedge projections being outward. It is evident that if the hand lever 104 is thrown in that direction as shown in dotted lines in Fig. 24 it engages same and holds the shifter in a central position so that the clutch 62 stands between pinions 57, 58 and is free from engagement with either of them, thus stopping the movement of the stock-frame.

*Stock frame.*—I will now describe the stock frame itself and its various parts. Supporting frame 3 forms with its two long inverted V-shaped bars the bed for the stock frame; runners 72 are shaped to fit said bars while the upper part of said runners are T-shaped; the front bar 70 is rigidly connected to the front ends of said runners, while the rear bar 71 is adjustable along said runners to accommodate various lengths of stock; when said rear bar is adjusted to its proper position, it is fastened by tightening cap screws 107; thereby plates 108 grip the T-shaped surface of the runners 72. Looking at Fig. 4, it will be noticed that said runners are not located at either end of bars 70 and 71 as found in such machines before, but are located some distance from the end. Two distinct advantages are gained thereby. First, a more rigid alinement of the stock frame along bars 3 during the operation of the machine, and second, no inside braces are needed between bars 70 and 71 when work is held between the center chucks, because runners 72, 72 being located between said center chucks take the place of such braces, and prevent bending of the long bars 70 and 71.

Outside braces 109 are used only in connection with other parts not shown to support long stock boards for flat stock between said rear and front bars 71 and 70. The front bar 70 is provided with seven head chucks, one for receiving the pattern, and six for the stock to be operated, said head chucks being composed of the following parts: Front bar 70 is provided with bearings 118 (see Fig. 40), said bearings to receive hollow spindle 110 with shoulder 110' resting against the face of said bar 70; the outward extension 119 of said spindle 110 is split in four parts and has a tapered mouth to receive the head 111' of bolt 111 to be inserted into spindle 110.

Adjusting plate 112 and the hollow cup shaped chuck 113 with spurs 113' are passed over the front end 119 of spindle 110. The rear end of bolt 111 is screw threaded and nut 114 forming a hand wheel, is screwed on, and tightening same against the rear end of spindle 110 forces the split ends 119 of the spindle into tight engagement with chuck 113 by drawing in head 111'.

Worm-wheel 115 is passed over the rear end of spindle 110 and screwed tight on same, the hub of said worm-wheel forming a shoulder for bearing 118. By loosening nut 114 the split members 119 are released from the chuck, leaving the latter free to revolve about the former, and thus permitting the operator to carefully adjust all the stock of the series in the plane of rotation of such stock, bringing the corresponding parts of each piece to be carved into accurate relation to the tools, by which the carving is effected.

Adjusting plates 112 are used to adjust the stock longitudinally outward or inward in line of the axis of suspension by tightening or loosening adjusting screws 112'. A series of worms 116 meshing with worm-wheels 115, are disposed along the horizontal shaft 120 attached to front bar 70 by bearings 117; mounted at the right end of said front bar 70 is bracket 121 with bearing 121' for said shaft 120 (see Fig. 42). The double-gear 126, 128 is carried at the end of shaft 120 and engages the loose pinions 127, 129; an extending arm of bracket 121 forms a fork 122; bearing 124 is carried by said fork by means of pivots 123. Shaft 125 driven from gears 255, 256 and shaft 206 of the feed-mechanism hereinafter described is carried by bearing 124; loose pinions 127, 129, are carried next to said bearing, collars 131, 132 holding said parts in position. The rear end of shaft 125 is carried by bearing 133 of connecting bar 73. Shaft 125 is provided with a groove 125'; a movable feather 130 with outward extending pin 130' is laid in said groove 125' between loose pinions 127, 129; the hubs of said pinions facing each other are provided with slots, said pin 130' engaging slot of loose pinion 127. It is evident that said loose pinion 127 is by the said pin 130' coupled to shaft 125, and pinion 126 being of the same size and meshing with pinion 127, the shaft 120 is driven at the same speed as shaft 125. This connection of gear is used for stock of smaller diameter, while for stock from eight to fourteen inches of diameter, the connection of gears 128, 129 is used by shifting the feather 130 so that the pin 130' engages the slot of pinion 129, thereby shaft 120 is driven slower than shaft 125 at any suitable speed, the present ratio being one to two. This arrangement of gears allows for the fine feed I need on my machine for finishing the work.

The rear bar 71 of the stock frame carries the tail stocks 134 (see Fig. 41) corresponding in number and location to the head-chucks carried by the front bar 70. Said tail-stocks are provided with centers 134' at their front, while at the rear end a shoe 135 is permanently mounted, said shoe being provided with an opening loosely embracing the screw threaded stud 139, the latter being firmly screwed into the rear bar 71. The shoe 135 is further provided with a semi circular flange 136 engaging groove 137 of a nut 138, screwed onto the stud 139, said nut forming a hand-wheel at its outer periphery. It is evident from the construction that by turning nut 138 to the right or left said tail-stock 134 is moved forward or backward in its bearing 143 for the purpose of engaging with its center 134' the rear end of the stock and holding the same firmly against the spurs 113' of the head-chuck. After the tail-stock is properly adjusted, the screw 140 passing through the screw thread at part 141 in the lower part of 71 and bearing against tail stock 134 is tightened, to hold said tail-stock firmly in its adjusted position during the operation of the machine.

*Flat stock.*—I will now describe how I hold flat stock on the stock frame, such as panels, brackets, tops, etc. The top surface of both front bar 70 and rear bar 71 is provided with correctly laid-out screw threaded openings 144 either two or more being used for each end of each stock board 145 and the stroke pattern 98; screw threaded studs 147 pass through the openings 146 of said stock boards and stroke pattern, said studs being provided with slot 148, thereby forming a head for the upper part of said studs 147. After screwing said studs into the bars 70 and 71 they are so adjusted that the head and part of the slot 148 project out above said stock boards; the wedges 150 are then passed over said heads with their circular openings 149; they are then passed forward so that the slot 151 of the wedge 150 engages the slot 148 of the stud 147, then they are driven tight. This manner of holding the stock boards has great advantages in facilitating and adjusting flat stock on the machine. The screw threaded openings 144 being properly laid out, the openings 146 (see Fig. 15) of the stock boards and stroke pattern are used to properly locate the latter on the stock frame thereby saving all the time of adjusting each piece of stock separately according to the tool for each piece, thus also making the stock boards interchangeable. The pattern 152 usually made of cast iron or other hard substance is screwed on the stock board from below, the stock 153 being fastened likewise on the stock boards.

*Feed mechanism.*—I will now describe the feed mechanism, used to feed the tools and tracer gradually across the stock and pattern during the reciprocating motion of the stock-frame, when operating on flat stock held on the stock boards, also the connection when said feed mechanism is used to turn the stock around past the cutters, while tracer and cutting tools are held against lateral motion during the reciprocating motion of the stock frame, when operating on stock, cut on more than one side and held in the center chucks for that purpose.

It is evident from the description given of the driving gear and reverse mechanism for the stock frame that shaft 54, alternately driven through clutch 62 by pinion 57 or pinion 58, is turned alternately to the left and right, said motion being used for the feed mechanism, by connecting the same to said shaft.

Shaft 54 is held in position against end play by collars 154—155. Loose-gear 156 is passed over the outward projecting front part of shaft 54, said loose-gear having a bevel face 157 on the inside of its rim; bevel friction cone 158 engages said bevel face 157, shaft 54 is provided with a short groove, a feather 159 carried by bevel friction cone 158 engaging the latter with shaft 54 but allowing end movement of said bevel friction cone. A heavy coilspring 160 is passed over the hub of said bevel friction cone, the outer end of shaft 54 being screw threaded. A collar 161 screwed on, engages the rear end of coilspring 160, and being tightened until said spring 160 furnishes sufficient pressure for the bevel friction cone, said collar is locked in position by lock nut 162.

Feed-adjusting gear 163 (see Figs. 17—18—19—20) meshes with loose-gear 156 and is driven by the latter; stud 164 is mounted in lug 165 of supporting frame 3 and forms the bearing for said feed-adjusting gear. Over the front part of the reduced hub 166 are passed the adjustable fingers 167 170 said fingers acting as stops for said feed adjusting gear; their outer noses 167' 170' engaging nose 181 of stop 180. Said two fingers are set apart such distance as needed for the feed mechanism, to feed the tools or work for a "roughing" cut, at each end of the stroke of the stock frame, said fingers being held in their adjusted position by tightening nuts 169 172 of bolts 168 171 whose heads engage the circular T-slot 163' of feed adjusting gear 163. A knob 174 is held by stud 175 to said feed adjusting gear 163 in the socket 174' provided for same; the nose 178 of knob 174 is held in the cross-slot 177 by the coilspring 176 bearing against the bottom of cylindrical opening 179 of said knob, the same being thereby firmly held against turning about its stud 175. It will be readily understood that the coilspring allows the knob, and more especially its nose 178 to be lifted out of the cross-slot 177. During the time the machine is used for roughing out, said nose is set inward toward the center of the feed adjusting gear (shown in dotted lines in Fig. 20), the fingers 167, 170 being so adjusted that the distance between the knob and one of the fingers is about one-fifth while the distance between the knob and the other finger is four-fifths of the entire distance the two fingers are set apart.

Now, as soon as the finishing of the work commences, the knob 174 is given a half swing so that its nose 178 points outward and now said nose acts as a stop and comes in contact with nose 181 of stop 180; it is so arranged, that the latter comes between the knob and the finger set one-fifth distance apart of the entire distance the two fingers are set apart, so that the feed motion only feeds one-fifth the distance for finishing, as used for the roughing cut. The use of this feed adjusting gear has the advantage of quick adjustment from roughing cut to finishing cut; it allows for a great range of divisions as needed for the greatly varying diameters of work held by the head-chucks and centers, and it allows to quickly change from an intermittent feed at the end of each stroke of the stock frame to a continuous feed used for changing the position of the tools on the work during various operations of the machine. Stop 180 is pivotally mounted by stud 182 to lug 183 of lap 184 extending out from supporting frame 3. As soon as either one of the outer extensions of fingers 167' or 170' or the nose 178 of knob 174 comes in contact with said nose 181 of stop 180 this will stop the feed-adjusting gear 163 from turning any farther, and meshing with loose gear 156, also stops the latter. However, as shaft 54 continues running it becomes necessary that the friction cone 158 feathered to the said shaft must slip at its bevel surface, holding it in engagement with said loose gear, the spring 160 being so adjusted as to allow said friction 158 to slip. The slipping of said parts continues to the end of each stroke, when the motion of shaft 54 is reversed, thus starting the feed adjusting gear 163 in opposite direction until it is again stopped by one of the fingers or knob before mentioned, the feeding thereby being effected at the beginning of each stroke of the stock frame. It will be understood that by giving the handle of stop 180 a quarter turn to the right, the nose 181 of said stop is brought out of engagement with said fingers or knob of said feed adjusting gear, the feed motion being thereby made continuous.

The rear part of feed adjusting gear 163 is formed into a bevel pinion 185, the same meshing with bevel-pinion 186 carried at the end of shaft 187, said shaft being held in bearing 188 supported by pinions 189 on lugs 190, said lugs being cast respectively on lap 184 and supporting frame 3. Shaft 187 extends through opening 187' of supporting frame 3 (see Fig. 1) toward the right side of the machine, and is supported by bearing 191 held between pinions 192, 192, of lugs 193, 193, (Fig. 25) the outer end of said shaft 187 carrying the pinion 194; the upright shaft 206 is carried by bearings 207, 208, of plate "P," disposed along said shaft 206; between bearings 207, 208, are loose pinions 195, 203, said loose pinions meshing with pinion 194 and being driven by the same; said two loose pinions are alike in construction so that only one will be described in detail (see Fig. 29). Pinion 195 carries an outward and rearward extending arm 196 having a socket 197, a pawl 198 being adapted to slip into said socket, a spring 199 passing over the reduced part 198' and keeping the pawl in engagement with ratchet wheel 202; pin 200 carried at the outer end of part 198' rests in slot 201 and keeps said pawl from turning while set for feeding the ratchet in one direction; loose pinions 195, 203, carrying pawls 198, 198 engage ratchet-wheels, 202, 205, keyed to shaft 206, alternately so that when one pawl engages the ratchet wheel and feeds forward, the other slips backward over the opposite ratchet wheel whereby a forward feed motion of shaft 206 is effected every time that pinion 194 is started to turn in an opposite direction, which takes place at the beginning of each stroke of the stock frame. Supposing that the tools have been fed across the stock from right to left for a roughing cut, the pawls 198 and 198 are lifted by the cross pin 200 out of their respective slots 201, then given a half turn so that the straight face of the tooth engaging the ratchet, faces in the opposite direction, thereby the tools are now fed from left to right for a finishing cut.

The bracket "C" is carried by extension "X" of the right side of the frame of the machine and in turn carries the following parts of the feed mechanism: The bearing 210 embracing sleeve 211 of spiral gear 212, a shoulder 213 of sleeve 211 holding said spiral gear in position (see Fig. 33); the upper face of said spiral gear is provided with pins 214 engaging corresponding holes in collar 215, same being movable endwise on shaft 206, but held in engagement by a feather entering the groove 206' of said shaft; collar 215 has a groove 216 engaged by fork 217 of bell-crank 218 pivoted to lug 219 by pivot 220; bracket "C" carries on its top an upward extending arm 221; a link 222 having a slot 223 engaged by stud 224 is held by pivot 225 on bell-crank 218, to limit the outward swinging motion of said lever to the length of said slot 223, shown in dotted lines in Fig. 30, thus giving the fork 217 sufficient upward motion to lift collar 215 out of engagement with the pins 214, thereby stopping the feed motion of shaft 206 to spiral gear 212 through which it passes; when said collar 215 is disconnected, then said shaft 206 turns freely in sleeve 211 of said spiral gear. (See dotted lines of Figs. 30, 31.)

Bracket "C" is further provided with a horizontal bearing 226, a second spiral gear 227 meshing with the first mentioned gear carries arms 228, 228 holding by means of pivots 229 229 the block 230. Said spiral gear 227 is mounted on stud 231 passing through bearing 226 and on a reduced screw threaded end, carries crank handle 233, same forming a shoulder for face of bearing 226 and when properly adjusted against end play of stud 231, is locked in position by locknut 234. Fork 235 engages through pivots 236 236 the free sides of block 230 thus forming a universal coupling; said fork 235 is fastened to the end of feed screw 237 entering the screw threaded part 238 of connecting arm 239 (see Figs. 54 55). Connecting said feed mechanism to the tool bar 99 of the machine, by the forked end 240 having pivots 241 engaging collar 242 passed over stud 243 extending out from lug 244 of section 245 of the tool bar. It is necessary that the connecting arm 239 be instantly connected or disconnected from the tool bar, therefore I provide the collar 242 with a flat washer 248 made of sheet iron or other suitable material, held flat against the outer face of said collar by pins 249 entering through ears 250 of said washer; said ears are far enough apart to allow a shifting side motion of said washer on said pins, circular opening 251 being passed over the front end of stud 243 until it slips into the circular recess thereof, 252, and is held in its engagement by the small coil spring 253 passed over one of the pins 249. If the machine is used for hand operation, the connecting arm 239 is disconnected from the tool bar by pressing sidewise against the washer 248 until it is lifted out of engagement with circular recess 252 then the collar 242 is slipped off the stud 243 and the connecting arm is swung upward and pushed into fork 254 at the upper end of bell-crank 218 thereby tilting said bell-crank backward and disconnecting the feed motion of said feed screw 237 (as shown in dotted lines in Fig. 30).

Stock held between head-chucks and tail-centers of the stock frame is commonly called "center-work" and will here be so designated. If center-work is made, the connecting arm 239 is connected to the tool bar, and so adjusted that the tools stand directly perpendicular over the longitudinal axis about which said work turns, the lever 218 remaining tilted over so that the feed motion of shaft 206 is not transmitted to the tool-bar, but the following parts are used forming a connection of the feed mechanism to the head-chucks of the stock frame: The upright shaft 206 carries pinion 255 meshing with pinion 256, connected by a short shaft carried in the upper bearing 258 of plate P, to pinion 259 meshing with pinion 260, said pinion being loosely mounted on shaft 125 but held in position between bearings 261, 261 of bracket 262. Said bracket is mounted on the horizontal flange 263 of plate P. Shaft 125 passes freely through bearings 261 and pinion 260 being held by bearings 124, 133 to the stock frame and consequently following the stroke of the same; said shaft is grooved its entire length by groove 125', a feather carried by pinion 260 engaging said groove, thereby imparting the feed motion to the head chucks through the various parts described before, at the beginning of each stroke of the stock frame.

Various kinds of stock such as table legs, brackets, caps and the like are carved on several sides or all around, and stock of that character is therefore held between the head chucks and tail-stocks but such stock presents mostly flat surfaces of irregular outline, therefore the stroke pattern 98 is used, the latter being held by bolts 147 and wedges 150 to the bars 70 and 71 and the tools fed across the pattern by means of a feed screw 237 and arm 239 connected to the tool bar 99, but as soon as one side is finished, the feed motion for the head chucks 113 is connected and the stock is turned around until another flat surface presents itself to the tools and is treated in the same manner as described before, then the stock is given another turn about the centers, and these alternate movements are repeated, until the various sides of such stock are completely finished.

In many cases, however, such stock as table legs, consoles, pilasters, brackets and the like, present two flat and two rounded surfaces, in which case the stroke pattern 98 is used for the flat surfaces in connection with the feed motion applied to the tool bar 99 but when operating on the round surfaces of such stock the tool bar 99 is held stationary and the feed motion applied to the head chucks 113; it therefore follows that when operating on such stock the feed motion is applied alternately to the tool bar 99 and to the head chucks 113 until all sides of such stock are completely finished.

The shape, size, and style of carvings vary so greatly that often other means for holding the stock are necessary in addition to the wedges, stock-boards and head-chucks hereinbefore described, in order to finish certain patterns, for instance, where the carving on the rim and adjacent framework of a table is continuous with that of the leg; the whole is fastened on to the stock-board and held with the wedges on top of the bars 70 and 71 of the stock-frame to get a good support for the biggest part of the work, then after as much as possible of the said piece has been operated on, the stock-boards are taken off the top of said bars 70 and 71, and the bar 71 then shifted back, leaving the carvings in their position on the stock-boards, which are now inserted between the head-chucks and tail stocks to finish the remaining part of the leg and upper corner of the rim. Many pieces of carvings are first put on the stock-boards, before they can be held between the head-chuck and tail stocks, as they are too thin and delicate and would bend if the pressure needed to hold them between the head-chuck and tail stock was brought directly against their ends. The feed mechanism to the head chucks may readily be disconnected, pinion 255 is adjusted upward on shaft 206 for that purpose, so as to disconnect pinions 255, 256.

*Tool carriage.*—The tool carriage is in its fundamental features the same as described in my Patent No. 832,136 dated Oct. 2, 1906, therefore some of its parts, like for instance the cords and drums, used for equal movements of both ends of the tube, and shown in Figs. 1, 2 and 3 are not described. It, however, differs in some important details: Arms 294 connecting tube 266 to the tool bar have only a short arm 265 extending to the rear, to connect the tightening springs of the belt tighteners (not shown), for tightening the belt 267 leading from the step-pulley 268 to the spindle pulley 269, the rear connecting tube being left off. Horizontal inverted V-shaped tracks 270 being carried by the sides of the frame for supporting said tool carriage. The tool bar 99 is made up of two sections 245, 247, a tube 246 being interposed between said sections and rigidly connecting the same, the following parts being rigidly mounted on said tube except the rings 277 and 290: (See Figs. 37, 38). A sleeve 271 with flanges and an upward extending arm 272 carrying a stud 273; tracer casing 274 extends with its reduced end through the flange of above sleeve 271 and the walls of the tube 246; tracer 299 is inserted in said casing. Adjusting-screw 275 is passed into the upper part of the inwardly screw-threaded end of the tracer casing, to give a fine adjustment to the tracer and prevent the latter from slipping in its adjusted position. When said screw is properly adjusted it is locked by lock nut 276. Ring 277 is located between sleeves 271, 278 on tube 246; fork 279 is pivotally engaged to said ring by pivots 280, said fork 279 being mounted on the front end of lock-rod 281 the rear end is provided with stop pin 516. Sleeve 278 has an upward extending boss 282 forming a socket for stud 284 held in said socket by set-screw 285, a collar 286 being loosely passed over said stud, said collar having a slot 287, screw 288 entering through said slot into one of the screw threaded holes 289, said slot allowing for a limited swinging motion of the collar about the shaft. Ring 290 Fig. 61 is located farther to the left from said sleeve 278, and loosely embraces the tube 246; it is held between the rigidly mounted collars 291, 291, hand screw 292 enters through the front part of said ring and bears against brake-block 293 held in the notch of said ring, said hand screw being used to keep the tool-bar from turning about its axis, during various hand operations of the machine. Connecting arm 294 engages set ring 290 by pivots 295, 295, said arm being provided with an upward extending rib 296. The bearing rings 99′, 290 and 277 are disposed along and loosely embrace the toolbar 99, and the latter is adapted to tilt about its longitudinal axis, in said bearing-rings. U-shaped bracket 100 described before is carried to the left of said ring 290 by tube 246; still further to the left is the adjustable split sleeve 297 carrying handle 298 mounted on the same; said handle is used to manipulate and guide the tools and tracer over the work, and pattern during the hand operation of the machine. The rings 277 and 290 and the rings pivotally held in the front forks of arms 264 form the bearings for the tiltable tool bar.

*Overhead drive for the tools.*—I employ an overhead drive from the drive shaft 315 toward the step pulleys 268 for each cutting tool, composed of the following parts: (See Figs. 6, 7, 52). The carriers 301 pivoted to the ears 302 by pivots 303, said ears being disposed along the tube 266; each carrier 301 is provided with flanges 304 having ribs 305, the brackets 306 being fitted with their rear ends 306′ to lie loosely between ribs 305; said end is provided with a slot 307 and held to flange 304 by cap-screw 308 entering through said slot into said flange.

The brackets 306 are provided with studs 309, 310 carrying idlers 311, 312, the drive belt 313 which leads from the pulley 314 of the drive shaft 315 over one of said idlers passing around the upper smaller step of the step-pulley 268 over the other idler upward, again to said pulley. To prevent forcible stretching of belts 313 during the swinging motion of brackets 306 with carrier 301 about pivots 303, 303, the pivot 316 for connecting said bracket to the lower end of supporting rod 317 is placed between the two idlers 311, 312, so that the two laps of said belt 313 pass on either side at equal distances from said pivot 316. The upper end of supporting rod 317 is held by a sleeve 318 loosely passed over shaft 315, said shaft forming the pivot about which said supporting rod swings; sleeve 318 is held between collar 319 and the hub of pulley 314. Belt 313 is held at constantly equal tension as follows: Bracket 306 has a downward extending flange 320; screw-bolt 321 screwed into same, its reduced end loosely entering carrier 301; tension spring 323 passed over said reduced end of said bolt 321 and bearing against a washer 324 lying against the shoulder formed at the offset of said bolt; said tension spring pushes bracket 306 outward or rearward and thereby keeps said belt 313 taut. The slack of said belt caused by wear, is taken up by the tightening screw bolt 321. All parts of the tool carriage not specially mentioned are the same as in my pending application referred to.

The drive shaft 315 is supported in bearings 325, 325 provided at the top of the sides of the frame F, further by the bearings 326 of bracket 327 the latter being mounted on braces B and B¹. Bracket 328 supports the outer end of the shaft 315 at the right side of the machine; pulley 329 is mounted on said outer end of said shaft; belt 330 connects pulley 16 and pulley 329. Idler 331 carried by stud 332 of arm 333, is pressed against one lap of belt 330 by a spring 334 passed over rod 335 held by pivot 336 to the frame of the machine. Nut 337 is tightened against said spring 334, said rod 335 passing loosely through the lug of lever 333, said lever swinging about stud 339 by which it is fastened to the frame of the machine.

*Tool bar-locking-mechanism.* (Figs. 5, 7.)—The retracting-mechanism of the machine is held between brackets 340, 341, said brackets being supported by braces B, B¹, B², and fastened to same by caps 340′, 340′ and 341′, 341′. The said brackets are connected by intermediate braces 342, 343. Lock 344 (see Figs. 12, 13) is held by vertical pivots 345, 345 between intermediate brace 343, and brace B²; said lock is for the purpose of holding the tool carriage against reciprocating motion backward and forward along the tracks 270, 270 during the automatic operation of the machine by engaging the rear end of lock-rod 281; said end has a transverse hole 346, locking pivots 347 entering said hole, said pivots being located in sockets 348′ of the outward extending hubs 348; extension-springs 349, 349 passed over said hubs keep said pivots 347 in engagement, one end of said spring being fastened to the lock, the other to the end of said pivot. When said lock-rod is held by said lock, then the latter turns about its vertical pivots 345, 345, during the transverse motion of the tool bar and tools over the stock; the tapered part 350' of center opening 350 of the lock provides room for the lock-rod to swing during the vertical motions of tools and tool bar about the pivot 347. When said lock-rod is disconnected during the hand operation of the machine, then it passes freely through said opening 350, the tapered part 350' allowing free swinging motion in all directions. Screw eyes 351 are screwed into the heads of pivotes 347. Cords 352, 353, are attached to same, cord 352 passing through opening 352' in the lower part of bracket 340, then over roller 354 carried by bracket 355 fastened to brace B², then upward to roller 356 carried by brace B, then toward the right to roller 357 and then toward the front to roller 358 carried by the shifter-plate S, the end of said cord being tied to handle 359. The other cord 353 passes through opening 353' of bracket 341, then upward over brace B toward the front and is then connected or tied to cord 352.

A fork 360 fastened to shifter plate S is adjustable, to provide for the stretching of the cord 352. When the lock-rod 281 is to be disengaged from block 344, handle 359 is pulled downward and hooked into the fork 360; this withdraws pins 347 out of the holes 346 of said lock-rod.

*Retracting device for the tools.*—The retracting device (see Figs. 5, 7, 8, 9, 10, 11 and 57) is composed of the various parts and works as follows: A hollow stud 361 is rigidly held in boring 362 in bracket 341, said stud having a reduced part 361'; a friction cup 363 is loosely passed over said reduced part, the outer part of said stud 361 forming a long head 364. Friction cone 365 loosely passes over said head and part of the hub of friction cup 363 so as to insure a perfect fit and engagement of the friction surface 366 of the friction cup and friction cone. A ring of hard fiber 368 is mounted on flange 365' of the friction cone and engages with the friction surface 366, a grooved pulley 370 being mounted on the hub of friction cone 365. The rear end of lifting chain 371 is fixed with pin 372 to said pulley, said lifting chain passing over roller 373 held in fork 374, eye 375 being fastened to the front end of said lifting chain and hooked to stud 273. Fork 374 is pivotally mounted on extension 376 of shifter plate S by pivot 377 so as to allow said fork a lateral swing about said pivot allowing the front lap of the lifting chain 371 to follow the transverse motion of the tools over the stock, during the automatic operation of the machine. It has been found of great advantage for the perfect operation of the friction members to pass the lifting chain 371 from pulley 370 first downward over roller 378 held in fork 379 mounted on intermediate brace 342 and then upward as described before. (See Fig. 6.) A double armed lever 380 is provided with a horizontal bearing 381 and is loosely mounted with said bearing on stud 382; said stud 382 is rigidly held in sockets 383, 384; the lower end of said double armed lever is provided with stud 385. Said stud 385 having a number of screw threaded holes 387 so that the collar 388 may be adjusted along said stud. The connecting arm 389 is pivotally held with its rear fork 390 to collar 388 by pivots 391, 391, said collar having a slot 392 to allow for a limited swinging motion of said connecting arm about said stud 385, screw 393 entering through said slot in one of the holes 387. The front fork 394 of said connecting arm 389 engages collar 286, carried by stud 284 of the tool bar by pivots 395. It is evident from the description that the connections at either end of connecting arm 389 form universal couplings allowing for horizontal and vertical motion, said connecting arm being curved out at 389' so it will not strike the tube 266 in its vertical motion. The upper arm of double armed lever 380 forms the horizontal tube 396 (see Fig. 10), plug 397 being loosely held in said tube in line with the axis of stud 361, said plug having a reduced end 398 and an opposite end 399 provided with a conical depression. A stationary end-wise adjustable bolt 400 is held in socket 401 of bracket 340; nuts 402, 402, are used for adjusting and holding said bolt in its adjusted position. The inner end of said bolt is provided with the conical-depression 403 and disposed between said conical-depressions 403 and 399 is the steel ball 404.

I will now describe the action of these parts, best explained by the diagram Fig. 58.

The two members, lock rod 281, and connecting arm 389 are pivotally held at their ends, said four centers being located parallel to each other so that stud 284 from pivots 395 to the longitudinal axis of the tool bar on tube 246, forms the front member of a parallelogram. The pivots 347 of lock 344, and the pivots 391 of the connecting arm 389, are located vertically over each other, and said vertical axis between said rear centers forms the rear member of said parallelogram. It is understood that the connecting arm 389 and lock rod 281 are only coupled up, forming said parallelogram, during automatic operation of the machine. It is evident that while the rear member of said parallelogram is held vertical, the front member is also held vertical and with it tracer and tools are also held vertical during the vertical motion of said tracer and tools.

Sufficient weight is applied to the tool-bar 99 to press the cutting tools into the stock to be operated so that the point of the tracer is constantly kept in contact with the pattern. Now when during the horizontal reciprocating motion of the stock frame, an abrupt projection strikes the side of the tracer 299, the retracting mechanism is set in motion to lift tracer and tools over said projection, acting as follows: (see dotted lines in Fig. 58.) The tool bar being held by lock rod 281 against reciprocating motion, the pressure received against the side of the tracer 299 is transmitted by stud 284, connecting arm 389 and stud 385 to double armed lever 380, whereby a slight side motion is given to plug 397; the ball 404 formerly resting perfectly in the conical depressions 399 403 is thereby forced out of same; (see Fig. 57) bolt 400 with its conical depression 403 being held perfectly rigid, the transmitted pressure from the tracer is all used against the movable plug 397 said plug being forced forward and outward of the tube 396 so that the reduced end 398 of said plug is firmly pressed against the end 406 of the hub of friction cone 365, thereby bringing said friction cone in firm frictional engagement with the constantly driven friction cup 363; the friction cone now starting to turn, winds up lifting chain 371 and consequently raises the tool bar to which its outer end is attached; thereby tracer and cutting tools are raised up to the top of the abrupt projection of the pattern. The compression-spring 407 inclosed in tube 407' of stud 361 comes now into action, pushing against plug 408, whose reduced end 409 loosely enters the central opening 410 and presses against the center of face 411 of plug 397, until said plug is pushed back to its limit; that is, until the ball 404 rests again firmly in conical depressions 399, 403. Thus the pressure of the plug 397 against the end 406 of the friction cone is relieved and the weight of the tool-bar, and pressure from the pressure-rod 412 pulling on the front end of lifting chain 371 unwinds said chain again, whenever the tracer follows a downward grade on the pattern, or drops suddenly into a deep recess of it.

The brake 413 (see Fig. 6) performs a double service, first it keeps the lifting chain 371 tight, and second it prevents sudden jerks of the friction cone 365, by engaging and pressing against its outer surface. The brake lever 413 is pivotally mounted by the vertical pivot 414 to lug 415 of intermediate brace 342; its outer arm pressing against the outer surface of friction cone 365 is provided with the leather cushion 416, the rear arm 413' having an opening 417 through which hand screw 418 loosely passes, the threaded end of the said screw being screwed into flange 419 of intermediate brace 342. Coil spring 420, (see Fig. 7) passed over said hand screw presses against the rear arm 413' of brake 413, thus pressing the opposite leather-cushioned end of said brake, against the friction cone 365, the pressure of said brake being regulated by said hand screw and spring 420. The slight frictional engagement of friction cone 365 with friction cup 363 caused by said brake is so adjusted that it is just sufficient to take up any slack in said lifting chain 371.

The compression-spring 407 is adjusted by screw bolt 422 provided with hand wheel 423 entered through the rear end of stud 361 and bearing against the plug 424 resting against said compression-spring; the latter is pressed together to such an extent as to over-come all the pressure of the various pieces of stock exerted against the cutting tools during the automatic operation of the machine. It is to be understood that through said compression-spring the plug 397 is held back under such a pressure that the ball 404 can not be forced out of the conical depressions 399, 403 by the pressure of said stock against the cutting tools, consequently the lever 380 and through same the tracer and cutting tools are held in perfect vertical position, and the friction members of the retracting mechanism are entirely relieved from that pressure. Only the pressure of the pattern against the tracer brings said retracting mechanism into operation.

It is obvious that compression spring 407 can be adjusted to the greatly varying conditions of the stock, as that may be thin or thick, hard or soft wood, a heavy or light cut may be taken, consequently the pressure of said stock against the tools varies accordingly. This is a principal feature of the various important parts and details to make my retracting mechanism exceedingly sensitive and precise in its action. Another feature is that it is adapted, and made very powerful by gearing; the friction surfaces 366 may be of a comparatively large diameter while the grooved pulley 370 where the power of the friction surface is applied to the lifting chain 371 can be made very small.

The side motion applied to the tracer by the pattern to set the retracting mechanism in motion is hardly perceptible being about one sixty-fourth of an inch as the ball 404 transmitting said motion to the friction members of said mechanism is forced up on both inclines of conical depressions 399, 403 thereby increasing said transmitted motion (see Fig. 57). It will be noticed that only one large friction cone is used while the ball 404 and plug 397 cause said cone to operate on both the forward or backward reciprocating motion of the stock-frame when the pattern engages the tracer.

The retracting mechanism is driven by the following parts: A small flanged pulley 425 is mounted on the drive shaft, 315; belt 426 leading from said pulley connects same with the pulley 427 mounted on shaft 428 carried by bearings 429, 429; a pinion 430 is mounted on said shaft and meshes with gear 431 formed by the outer periphery of the friction cup 363 whereby said friction cup is driven.

*Counterbalance for hand operation.*—During hand operation of the machine the tool carriage must be perfectly counter-balanced, while during the automatic operation, a great deal of the weight of the tool carriage is used to press the cutting tools into the stock and keep the tracer in constant contact with the surface of the pattern, therefore I provide the following adjustable counter balance (see Figs. 1, 2, 43, 44): A flange 432 is fastened to the ceiling or other suitable support above the machine; a stem 433 being fastened in same and extending downward carries the collar 434 on the reduced end 435, a flange 436 and nut 437 supporting said collar; the balancing arm 438 has a central opening 439, bosses extend outward from the walls of said opening, bolts 441 are screwed into said bosses and their reduced ends enter center holes 442 of collar 434, thus forming the center for the vertical swing of said counter balance. A round bar 443 mounted in socket 444 forms the rearward extension of balancing arm 438; a fork 445 (Fig. 1) is loosely held by pivot 446 to said balancing arm; a wire rope 447 connects the flange 296 of arm 294 with said fork 445, thus forming the connection between the tool carriage and counter balance, the ends of said wire rope being locked in the clip 448. The counter-weight 449 has a horizontal opening 450 and is thereby loosely slipped over bar 443. To shift said weight along said bar the following parts are used: A wheel 451 provided at its rim with a groove 452 is held in a horizontal position by the vertical stud 453 at the outer end of the bar 443. A chain 456 fastened with eye 457 to counter weight 449 leads around the groove 452 of wheel 451 over roller 458 then downward forming a loop and up again over roller 459 where its other end is also fastened with eye 460 to weight 449. The rollers 458, 459 are loosely passed over the outer ends of pivots 441 held by their heads from slipping off; the head of the pivot for roller 459 extending outward is engaged by the fork 461 of clip 462; the upper end of said clip embraces with its fork 463 the stem 433 to which it is pivoted by pin 464.

Said clip 462 is used to prevent the counter balance from turning about the stem 433 during automatic operation of the machine, while during hand operation it is raised out of engagement by cord 465 fastened to said clip at the eye 466. Said cord is then drawn upward passing over the two small pulleys 467, 468, then downward where its lower end provided with ring 469 is fastened to hook 470 during hand operation of the machine, (see Figs. 6, 47), when said counter balance must turn about its stem 433 to accommodate the forward and backward motion of the tool carriage. As previously stated, the counterweight 449 is adjusted along the bar 443 and is held in its adjusted position by retaining hooks 471 entering slots 472 of counter weight 449 to which they are pivoted by pins 473, the lower side of the rear end of arm 438 being provided with nose 474 engaged by the inner one of the retaining hooks 471 and held in position by spring 475. This is the position of the counterweight during the automatic action of the machine as shown in Fig. 1. A set collar 476 is mounted on bar 443, and is adjusted along said bar to act as a stop for the counter weight in its proper place near the outer end of bar 443 to fully counter-balance the tool carriage during the hand operation of the machine. To shift the counter-weight from its inner to its outer position along said bar 443, it is first released by pulling on cord 477 fastened on the retaining hooks 471; said hook is pulled down and out of engagement with nose 474, then the operator pulls the inner lap of the loop of chain 456 running over roller 458 thereby pulling the counter weight outward on bar 443 until it strikes the set collar 476 where the outer retaining hook 471 engages the nose 480 of said set collar, whereby it is locked and held in that position for hand operation of the machine, until it is again changed for automatic operation.

*Pressure rod.* (See Fig. 39).—A pressure rod 412 is provided for the following purposes, first to assist in pressing the tools into the stock and to keep the tracer in constant contact with the pattern, second to counterbalance the right side of the tool bar, same being shorter than the left side from the tracer as a supporting point outward, consequently the left side would have a slight tendency to sag, especially noticeable when the tracer suddenly drops from some high point of the pattern into a recess; third, it is used to operate an automatic stop for the machine.

The pressure bar 412 is universally coupled to support 481; pivots 482 hold collar 483, the upper end of the tube 484 is loosely inserted and pivoted to said collar by pin 485 disposed at right angles to pivots 482, sufficient play being left between the socket 481' and collar 483 and between said collar and tube 484 so that the latter can swing laterally in any direction about its pivot. A sleeve 486 is mounted on the lower end of tube 484, said sleeve having a split lug 487 provided with a hand screw 488 to clamp and hold the adjustable tube 489 inserted in tube 484; a second sleeve 490 is mounted on the lower end of tube 489; pressure rod 412 is loosely passed through said sleeve into tube 489; a long extension spring 491 is loosely passed over pressure rod 412, the lower end of said spring being mounted at the lower end of tube 489, while the upper end engages the top end of said pressure rod 412. It is evident therefore that when the pressure rod is pushed upward into the tube 489 the extension spring 491 expands and exerts a downward pressure on pressure rod 412 and consequently on the tool bar at the counter sunk $492^1$, engaged by the cone-pointed lower end $412^1$ of the pressure rod. The tension of the expansion spring 491 can be adjusted at will by adjusting tube 489, to which the lower end of said spring is attached, up or down in tube 484. Said pressure bar 412 is only used during the automatic operation of the machine; it is then disengaged from the tool-bar by pushing it upward into tube 489 and is locked by set screw 492.

*Stop mechanism.*—The shifter mechanism (see Figs. 47, 48, 49, 50, 51) providing for an automatic stop of the machine is as follows: A floor bracket 493 supports the adjustable bearing 494 of the outer end of drive-shaft 15 holding tight pulley 17 and loose pulley 18 to which the belt 455, (shown in dotted lines in Fig. 51) from the line shaft or other source of power, supplies the power to drive the machine. Floor bracket 493 is supplied with lugs 495 through which the outer ends of shifter rods 496, 496 pass freely. Shifter forks 497, 498 are mounted with their respective lugs to said shifter rods, bracket 499 serving as a support for the shifter rods same passing freely through its lugs; said bracket also acts as a stop for the shifter in its inner position throwing the belt on the loose pulley 18; the shifter rods also pass freely through the lugs of bracket 500 and form a support for the inner ends of said shifter rods; the brace 501 is firmly mounted with its lugs to the ends of said shifter rods and connects the same; an expansion spring 502 is connected with its ends to the stubs $502^1$, $502^1$ carried by bracket 500 and fork 498.

The shifter plate S is carried by the outward extending bracket 341 and is used as a central base, handy for the operator to make the various changes for changing the machine from automatic to hand operation, or reverse. The machine is also started and stopped from this shifter plate.

The belt shifter is operated from the shifter plate S as follows: Chain or rope 503 is fastened with its lower end to brace 501 by pin 504, it is then passed over roller 505 carried by fork 506 fastened to the floor, said chain is then passed upward over roller 507 (see Fig. 1) then slanting upward to the left over roller 508 (see Figs. 5 and 6) supported by bracket 509, then over roller 510 supported by shifter plate S where the upper end of said chain 503 is fastened to eye 511 carried by the foot plate 512 to which handle 513 is pivoted by pin 514; said foot plate is provided with socket 517 (see Fig. 49). The shifter plate S is provided with vertical ribs having slots 518, 518; said foot plate 512 is fitted to shift up and down in same. The handle 513 has a socket $517^1$ in line with socket 517 of the foot plate, expansion spring 520 being slipped into the sockets. The lower part of handle 513 forms the hook 521 adapted to engage and hook into the block 522 when the handle is pulled down to start the machine.

Disposed near the lower edge of shifter plate S are horizontal ribs provided with slots 523, 523; the double flanged bar 524 is adapted to slide with its rear flange into said slots until block 525 carried by the web of bar 524 stands directly in front of nose 526 extending from the lower part of handle 513; this locks the hook 521 of said handle perfectly against the tendency of expansion spring 520 to push said hook off and out of engagement with block 522.

The dogs 527, 527 are slotted and clamped to the front flange of bar 524 by clamp-screws 528, 528, said dogs being adjustable along said bar and are set according to the width of the stock to be cut; the pressure-rod 412, engaged with its conical point 412' to the countersunk 492 of the tool bar, is taken along by the latter as it is gradually fed across the stock; said pressure-rod meets and pushes against one of the dogs 527 (as shown in dotted lines in Fig. 47) shortly before the entire width of the stock is cut; said dogs being rigidly clamped to bar 525 push same along in slots 523 until block 525 is pushed away from in front of nose 526 of handle 513, (this takes place when the entire width of the stock is cut) the spring 520 now pushes the handle 513 outward until hook 521 is released from block 522 (shown in Fig. 49). Then the expansion-spring 502 contracts, pulling the main-drive belt 455 on to the loose pulley 18 by means of the belt shifter until the inner shifter fork 498 strikes bearing 499, then the machine stops. During said motion of the belt shifter the foot plate 512 and handle 513 are pulled upward in the slots 518 of the vertical ribs of the shifter plate S by chain 503. The shifter plate S is provided with a hook 515, to receive eye 375 of lifting chain 371, and hold said chain during hand-operation of the machine.

*Tool-stop.*—When during the automatic action of the machine very deep cuts are made, the tools must be stopped in their vertical motion before they reach the bottom of the deepest recesses.

Said stop consists of the following parts: (See Figs. 3, 5, and 6) Arm 530 pivoted to bracket 340 by pivots 531, 531; a vertically adjustable bolt 532 forming a hook 532' at its lower end; said bolt is held and adjusted in the front end of arm 530 by nut 533; a chain 534 is mounted with its lower end to flange 296 of arm 294 (Fig. 61) while its upper end engages hook 532'; the bolt 532 is so adjusted that the machine at the first operation on the stock will only cut the highest parts of it, after that is done said stop is adjusted for a deeper cut until the whole depth of the pattern has been reached. It is evident that during an upward motion of the tools said chain will fold within itself while during the downward movement of the tools it unfolds to its limit, and then stops the tools from further vertical motion. Said stop is also used so that the tools may not touch the stock boards 145 after they leave the stock during the reciprocating motion of the stock frame. The transverse motion of the tool bar over the stock is followed by the arm 530 swinging about its pivots 531, 531 so that the chain 534 is always held substantially vertical during the automatic operation of the machine.

*Operation.*—Having described all the various parts of the machine and their operations, I will add a brief summary of the operation of the machine, referring especially to the changing of the machine from automatic to hand operation.

The machine is shown in automatic operation, on stock held on stock-boards 145 as shown in the illustrations so that all the parts are shown in proper connection for such work. Full reference has also been made to the use of the feed mechanism when the stock is held between centers. To start the machine the handle 513 is pulled down and locked by bar 524. The handle 69 is pulled out before starting the machine, so that the stock frame remains stationary until the tools are properly adjusted to engage the stock, then said handle and rod 66 is pushed inward so that its key engages the gear 65 thereby starting the reciprocating motion of the stock frame; as soon as an upright projection of the pattern strikes the tracer, the retracting mechanism is set in motion, by engaging its friction members to lift the tracer and tools over said abrupt surface, then the adjustable spring 407 disengages said friction members and receives all the pressure exerted by the stock against the cutting tools. Each stroke of the stock-frame is continued until the rod 86 comes in contact with one of the offsets of the stroke-pattern, whereby the reversing mechanism is set in motion and the stroke reversed. The feed-mechanism gradually feeds the tools laterally across the stock until the entire surface of the pattern has been covered, thus producing a number of correct copies of same according to the number of tools used, then tube 489 of the pressure rod 412 strikes against one of the dogs 527, and causes the release of the handle 513, whereby the machine is stopped.

Small tools and tools for cutting sharp corners cannot be used during the automatic operation of the machine, therefore the work produced by the automatic operation, while it is a correct copy of the pattern in general, still lacks the fine details produced by the afore mentioned tools; the latter are now inserted and the machine is adjusted for hand operation as follows: The pressure rod 412 is disconnected from the tool bar by pushing it upward, and is then locked in tube 489 by set screw 492. The counter-weight 449 is then brought to its outer position. The connecting-arm 239 is disconnected from the tool-bar by releasing washer 248 out of groove 252 of the bolt 243 and removing the collar 242 from the said bolt, when the connecting arm 239 is tilted upward (as shown in dotted lines in Fig. 30) and laid in fork 254 of bell-crank 218. Lifting chain 371 is disconnected from stud 273 and fastened on hook 515 on shifter plate S (see Fig. 47). Stop chain 534 is unhooked from hook 532'. Rod 86 is dropped below the surface of the stroke pattern 98. Connecting arm 389 is uncoupled from the tool bar by loosening screw 285 and lifting stud 284 out of its socket of boss 282. Handle 359 is then pulled down and hooked in fork 360 thereby disconnecting pins 347 of lock 344 from the lock rod 281; same is now free to be used for hand operation. To prevent the tool carriage from rolling off the front ends of tracks 270, lock rod 281 is provided with a projecting stop-pin 516, the rearward motion of the tool carriage being limited by the tube 266 striking the lower parts of the downwardly extending brackets 340, 341. If the stock is of any length so that the operator cannot reach every part of it conveniently with the tools while standing in front of the stock-frame, he takes out the stroke pattern 98, runs the stock frame sufficiently out in front, and then occupies the room formerly taken up by the stroke-pattern; facing the tools he has the pattern at his right hand and one of the pieces of stock to his left. If the stock frame is run out its front on the supporting frame 3 to its limit, then the operator can walk conveniently back and forth between pattern and stock and can reach every detail of the work. This is of great importance, as formerly the operator had to reach and bend over the stock frame or table of a horizontal machine until he almost lay flat on his stomach, thereby losing control of the tools and losing a great deal of time, first in adjusting the stock on the table, and then in operating on same. The average depth of the work table of a horizontal machine is six feet so it is easily understood what an awkward position the operator has to take trying to reach over it while standing in front of the machine.

A principal feature of my invention, to relieve the friction members of the retracting mechanism, from the pressure of the stock against the cutting-tools, may be accomplished by other appliances, and may be used separately and applied to machines of known construction. Various appliances may be used in place of my stroke pattern and reverse-mechanism without changing the nature or principal features of my invention.

It may further be stated that the lock rod 281 can be used as connecting bar between the tool bar and the retracting device, if said lock rod is pivoted directly to the tool-bar, so that the latter is held from turning about its axis. With that arrangement the connecting bar 389 would not be needed. In that case, however, the tools would not be lifted in a vertical position, but follow in line of the periphery of a circle about the connecting pivots 391 at the rear end of said lock rod. Fig. 65 illustrates said modified construction.

Having described my invention what I claim as new and desire to secure by Letters Patent is:

1. In a carving machine, a tool-bar provided with a tracer and cutting tools, a retracting device mounted on the frame of the machine, a bar disposed at right angles with the tool-bar, and suitable couplings for said bar to connect the tool-bar and the retracting device to transmit the pressure brought against the side of the tracer to the retracting device and a flexible transmitter, to transmit the action of the retracting device, to the tool-bar and acting upon the tracer and tools in line of their axes, substantially as set forth.

2. In a combined automatic and hand carving machine, a reciprocating frame, means for holding pattern and stock in said frame, a tool-bar provided with a tracer and cutting tools, a retracting device mounted on the frame of the machine, a flexible transmitter and means including a bar connecting the tool-bar and the retracting device during the automatic motion of the machine, and means to readily disconnect the tool-bar from the retracting device for hand operation of the machine, substantially as set forth.

3. In a carving machine a tool-bar provided with a tracer and cutting tools, a retracting device, connecting members between said tool-bar and retracting device to transmit the pressure brought at right angles against the axis of the tracer to the retracting device, and another connecting member to transmit the action of the retracting device to the tool-bar and acting in line of the axis of the tracer, substantially as set forth.

4. In a combined automatic and hand feed carving machine a reciprocating stock frame, means for holding pattern and stock in said frame, a tool carriage reciprocating in a plane parallel with said stock frame, a tool-bar forming the outer member of said tool carriage, a locking device mounted on the frame of the machine, a bar coupled to the tool-bar one end of said bar passing freely through said locking device during hand operation of the machine, and means to readily close said locking device on said bar and thereby lock said tool carriage during automatic use of the machine, substantially as set forth.

5. In a carving machine, a tool-bar having tracer and cutting tools, a tool carriage, said tool-bar tiltable about its axis, a bar coupled to said tool-bar at right angles to the same, a locking device, said bar passing freely the said locking device during hand operation of the machine and means carried by said locking device to lock said bar against movement in line with its axis during automatic use of the machine, substantially as set forth.

6. In a carving machine, a tool-bar, having tracer and cutting tools, a tool carriage, said tool bar tiltable about its axis, a bar coupled to said tool-bar at right angles of the same, a locking device for said bar, a retracting device, a stud carried by said tool-bar, a second bar connecting said stud with the retracting device, and means to readily disconnect said bars so as to permit free movement to the tool-bar, substantially as set forth.

7. In a carving machine, a tool-bar having tracer and cutting tools, a stud carried by said bar, a retracting device, a bar pivotally connecting said stud and the retracting device, a pivotally mounted locking device on the frame of the machine, a second bar pivotally connecting the tool bar to said locking device, the pivots for the two bars lying parallel to each other, for the purpose set forth.

8. In a carving machine, a tool-bar, cutting tools disposed along said bar, a tracer located near the center of same, a ring embracing the tool bar and located next to the tracer, a bar having a forked end pivoted to said ring, a locking device pivotally mounted on the frame of the machine, the free end of said bar passing through said locking device, means to engage and means to disengage said locking device from said bar, substantially as set forth.

9. In a carving machine a tool-bar, cutting tools and tracer disposed along same, a bar coupled to the tool-bar at right angles to the longitudinal axis of the latter, the coupling being located next to the tracer, the free end of said bar being coupled to the frame of the machine, and means to readily disconnect said bar for the purpose set forth.

10. In a carving machine, a tool-bar, cutting tools and tracer disposed along the same, a bar coupled next to the tracer, at right angles to the tool-bar, the free end of said bar being coupled to the frame of the machine, a retracting device, a stud carried by said tool-bar, a second bar connecting said stud with said retracting device, and a flexible transmitter connecting the retracting device and the tool-bar, substantially as set forth.

11. In a retracting mechanism for automatic carving machines, a constantly rotating member, a second member capable of rotation, a flexible transmitter for said second member and devices to engage and disengage the two aforesaid members, for the purpose set forth.

12. In a carving machine a retracting device comprising a constantly rotating member, a second member capable of rotation, a device connecting and a device disconnecting the two aforesaid members, a tool-bar, a connecting bar and a flexible transmitter connecting said retracting device to said tool-bar carrying tracer and cutting tools for the purpose set forth.

13. In a carving machine a retracting device comprising a constantly rotating member, a second member capable of rotation, a tool-bar carrying tracer and cutting tools, connected to and controlled by said second member, a device connecting and a device disconnecting the two aforesaid members and a connecting bar extending at right angles from said tool-bar and forming a connection between said device and the tool-bar, substantially as set forth.

14. In a carving machine a tool carriage, tracks mounted on the sides of the machine for said carriage, the frame work connecting the upper part of the sides, carrying a locking device, a bar connecting the tool carriage to said locking device, and suitable couplings between said bar and tool carriage, substantially as set forth.

15. In a carving machine a tool-bar capable of horizontal and vertical movement, an arm pivoted to the upper frame work of the machine and carrying an endwise adjustable hook and chain, one end of said chain being connected to the tool-bar, limiting the downward movement of the tool-bar, substantially as set forth.

16. In an automatic carving machine, a tool carriage having a tool-bar, tracks mounted on the sides of the machine for said carriage, stationary parts forming the upper connection of the sides, a retracting device carried by said parts, a flexible transmitter between said retracting device and tool-bar, and guide rolls for said flexible transmitter, substantially as set forth.

17. In an automatic carving machine, a tool carriage, a tool-bar forming the outer part of same, tracer and cutting tools for said tool bar, stationary parts forming the upper frame of the machine, a locking device, a locking bar between said tool-bar and locking device, suitable couplings for said locking bar, a retracting device, a connecting bar and flexible transmitter between said retracting device and tool-bar and a device connecting with the tool-bar to limit the downward movement of the cutting tools in line of their axes, substantially as set forth.

18. In an automatic carving machine a retracting device comprising a constantly rotating member, a second member capable of being rotated thereby, a tool-bar, a flexible transmitter between said second member and tool-bar, an adjustable brake for said second member and a device to engage and a device to disengage the two aforesaid members, substantially as set forth.

19. In a carving machine, a tool carriage having a tube forming its central body, a tool-bar carrying tracer and cutting tools, arms pivotally connecting tool-bar and tube, step-pulleys mounted along said tube, belts between each step-pulley and tool, a bracket for each step-pulley pivotally connected to said tube, a pair of guide rollers carried by each bracket, a drive-shaft parallel with said tool carriage, a pulley for each tool mounted on said shaft, and a belt leading from each pulley over the guide rollers to each step-pulley, substantially as set forth.

20. In a carving machine, a tool carriage having a tube forming its central body, a tool-bar carrying tracer and cutting tool, arms pivotally connecting tool-bar and tube, a step-pulley mounted on said tube, a belt leading from said step-pulley to the cutting tool, a bracket pivotally connected to said tube and carrying a pair of guide rollers, a drive-shaft parallel with said tool carriage, a pulley on said drive-shaft, and a belt leading from said pulley over the guide rollers to said step-pulley, substantially as set forth.

21. In a carving machine a tool carriage having a tube forming a central body, a tool-bar carrying tracer and cutting tool, a step-pulley mounted on said tube, a belt leading from the step-pulley to the cutting tool, a bracket carrying guide rollers pivotally mounted on said tube, a drive-shaft parallel to said tool carriage, a pulley for said shaft, a belt leading from said pulley over the guide rollers to said step-pulley and means to tighten said belt, substantially as set forth.

22. In a carving machine, a tool carriage having a tube forming its central body, a tool-bar carrying tracer and cutting tool, a step-pulley mounted on said tube, a belt leading from the step-pulley to the cutting tool, a bracket carrying guide rollers, a shaft parallel to said tool carriage, a rod forming a connection between said shaft and said bracket, a pulley for said shaft, a belt leading from said pulley over the guide rollers to said step-pulley, and a device on said bracket to tighten the belt, substantially as set forth.

23. In an automatic carving machine, a feed mechanism, a drive-shaft, tight and loose pulleys for same, a drive belt, a belt shifter, means to operate said belt shifter automatically by means of said feed mechanism to stop the machine, substantially as set forth.

24. In an automatic carving machine, a reciprocating stock frame carrying pattern and stock, a tool-bar disposed parallel with the surface, but at right angles to the direction of reciprocation of the stock frame, tracer and cutting tools mounted upon said tool-bar, feeding means to bring the tools in contact with the entire surface of the stock, a main drive-shaft, power connection to said shaft, and means to automatically disconnect said power connection from said drive-shaft at any predetermined point of travel of the tools or stock frame, substantially as set forth.

25. In an automatic carving machine, a reciprocating stock frame carrying pattern and stock, a tool-bar parallel with the surface of said stock frame, tracer and cutting tools mounted upon said tool-bar, a pressure bar connecting with the tool bar keeping the tracer in close contact with the pattern, means to feed the tool and tracer across the stock and pattern, a drive-shaft, a suitable source of power adapted to be connected to said shaft, said pressure bar for disconnecting said source of power from said shaft substantially as set forth.

26. In an automatic carving machine, a stock frame, a base upon which said frame travels, a drive-shaft, an adjustable friction wheel carried by said shaft, a disk driven by said frictional wheel, a shaft for said disk, a device to keep said disk and friction wheel in constant engagement under adjustable elastic pressure, and a device driven by said disk to drive said stock frame, substantially as set forth.

27. In an automatic carving machine, a stock frame, ways upon which said frame travels, a drive-shaft, an adjustable friction wheel carried by said shaft, a disk driven by said friction wheel, a shaft for said disk, a device to keep said disk and friction wheel in constant engagement under adjustable elastic pressure, and devices driven by said disk to reciprocate said stock frame automatically at varying speed, substantially as set forth.

28. In an automatic carving machine, a stock frame, ways upon which said frame travels, a drive-shaft, a second shaft at right angles thereto, a variable friction drive between the two shafts, a worm for the second shaft, a third shaft at right angles to the two aforesaid shafts, a worm wheel for the third shaft meshing with the said worm, and devices driven by the said third shaft to reciprocate the stock frame automatically, substantially as set forth.

29. In an automatic carving machine, a stock frame, a second frame, ways for the stock frame forming part of the second frame, said second frame provided with a casing for reversing gearing, reversing gearing therein, means to connect said stock frame to said reversing gearing, four spindles with mechanism to elevate the same, said spindles acting upon said second frame, a drive-shaft, a variable speed connection between said drive-shaft and said reversing gearing, substantially as set forth.

30. In an automatic carving machine, a stock frame, a stationary screw spindle for same, a second frame with ways for the stock frame to travel on, a driving gear carried by said second frame, said driving gear connecting with said screw spindle, a variable speed friction drive for said driving gear, and a device to automatically reverse the action of the driving gear for the screw spindle, substantially as set forth.

31. In an automatic carving machine, a stock frame, a screw spindle for same, a second frame with ways for the stock frame to travel on, a nut for said screw spindle, stationary bearings to prevent endwise motion or play of said nut, a driving gear operating said nut, devices to automatically reverse the action of the driving gear, a drive-shaft, and a variable speed drive connecting said drive-shaft to said driving gear, substantially as set forth.

32. In an automatic carving machine, a stock frame, a driving gear for the stock frame, comprising a constantly driven bevel-gear, a shaft disposed parallel to the diameter of said bevel-gear, two loose pinions carried by said shaft and meshing with said bevel-gear, a sleeve splined on said shaft movable endwise and held between said pinions; means to engage said sleeve with one or the other of said pinions, a gear mounted on said shaft connecting with the means to drive the stock frame, and means to disconnect said gear from said shaft, substantially as set forth.

33. In an automatic carving machine, a stock frame, a driving gear, a reversing device for said driving gear, comprising a shaft, a tilting lever movably mounted on said shaft, an arm mounted near one end of said shaft, a rod engaged by said arm to operate the reversing device, springs and adjustable collars for said rod, and retaining hooks to hold the above tilting lever stationary during each stroke of the stock frame, substantially as set forth.

34. In an automatic carving machine, a reciprocating stock frame, a stroke pattern carried by same, a tool-bar, means to feed said tool-bar across said stock frame, a driving gear, a reversing device for said driving gear, and means including a bar to connect said reversing device and tool-bar to act in conjunction with said stroke pattern, for the purpose set forth.

35. In an automatic carving machine, a reciprocating stock frame, a driving gear for same, a tool-bar disposed parallel with the surface, but at right angles to the direction of reciprocation of the stock frame, a feed mechanism connecting said driving gear and tool-bar, and a device for said feed mechanism to interrupt its continuous action, substantially as set forth.

36. In an automatic carving machine, a reciprocating stock frame provided with means to hold various kinds of stock, a toolbar carrying tracer and tools, a driving gear, a feed mechanism comprising a bevel friction, bevel gears and connecting shafts, a gear held in contact with the driving gear of the stock frame by means of said bevel friction, a feed adjusting gear, adjustable stops for same providing for a coarse feed for roughing and a fine feed for finishing, two ratchet wheels, ratchets and pawls for same connected by means of suitable bevel gears and connecting shafts to said feed adjusting gear, and gears to connect said feed mechanism either to the tool bar, or to the mechanism for rotating the pattern and stock, for the purpose set forth.

37. In an automatic carving machine, a reciprocating stock frame provided with means to hold various kinds of stock, a toolbar carrying tracer and tools, a driving gear, a feed mechanism comprising a gear held in constant engagement with the driving gear of the stock frame by means of a friction disk, a feed adjusting gear, adjustable stops for same providing for a coarse feed for roughing and a fine feed for finishing, the rear part of said feed adjusting gear forming a bevel pinion, a second pinion meshing with aforesaid pinion, a drive shaft, a third pinion on the opposite end of said shaft, a second shaft at right angles to the first shaft, a pair of pinions carrying pawls driven by said third pinion, a pair of ratchet wheels in contact with said pawls, a bracket mounted on the frame of the machine carrying a pair of spiral-gears, the second shaft connected to one of the spiral-gears, a screw spindle, the second spiral-gear connected by means of universal coupling to said screw spindle, a tool-bar, an arm connected by means of universal coupling to said tool-bar, said arm forming a nut on one end for said screw spindle, substantially as set forth.

38. In an automatic carving machine, a stock frame and means for reciprocating the same, a driving gear for same, a tool-bar disposed parallel with the surface, but at right angles to the plane of reciprocation of the stock frame, an arm connected by means of universal couplings to said tool-bar, said arm forming a nut on one end, a screw spindle for said nut, a universal coupling for the free end of said screw spindle, and a feeding mechanism connecting said driving gear of the stock frame with said universal coupling of said screw spindle, substantially as set forth.

39. In a combined automatic and hand carving machine, a reciprocating stock frame, a driving gear for same, a feed mechanism connected to said driving gear, a tool-bar disposed at right angles to the direction of reciprocation of said stock frame, an arm containing a feed screw forming the connection between said feed mechanism and said tool-bar, and means to readily connect and disconnect said arm from said tool-bar, substantially as set forth.

40. In a combined automatic and hand machine, a reciprocating stock frame, a driving gear for same, a feed mechanism connected to said driving gear, a bracket mounted on the frame of the machine carrying parts of said feed mechanism, and a device to connect and disconnect said parts, a tool-bar disposed at right angles to the direction of reciprocation of said stock frame, an arm containing a feed-screw forming the connection between said feed mechanism and said tool-bar, means to readily connect and disconnect said arm from said tool-bar, said arm when disconnected acting in unison with said device to disengage said parts of the feeding mechanism carried by said bracket, substantially as set forth.

41. In an automatic carving machine, a reciprocating stock frame, a driving gear for same, a feed mechanism connected to said driving gear, head-chucks and tailstocks carried by said stock frame adapted to hold pattern and stock, means to rotate said head-chucks in conjunction with each other by said feeding mechanism, and a device for said feed mechanism to provide for a coarse feed for roughing and a fine feed for finishing the work, substantially as set forth.

42. In an automatic carving machine, a reciprocating stock frame, pattern and stock carried by same, a tool-bar carrying tracer and cutting tools, means to feed said tool-bar automatically transversely over said pattern and stock, head-chucks and tail-stocks carried by said stock frame, feed mechanism to automatically rotate said head-chucks in conjunction with each other, and means to move said stock frame toward and away from said tool bar to accommodate stock of various thicknesses, substantially as set forth.

43. In an automatic carving machine, a stock frame carrying pattern and stock, a tool-bar carrying tracer and cutting tools, bearing for said tool-bar, said tool-bar being adapted to a slight tilting motion in its bearings under pressure of abrupt projections of the pattern against the tracer, a device to keep said tool-bar from tilting under the pressure of the stock against the cutting tools, and a retracting device adapted to retract tracer and cutting tools being brought into action by the pressure of abrupt projections of the pattern against the tracer, substantially as set forth.

44. In an automatic carving machine, a reciprocating stock frame carrying pattern and stock, a tool-bar carrying tracer and cutting tools, bearings for said tool-bar, the latter being adapted to a slight tilting motion in its bearings under pressure, a device containing adjustable means to keep said tool-bar from tilting under the pressure of the stock against the cutting tools, said device being adjustable to the varying pressure caused by varying depths of the cut and by the varying materials to be operated on and being adapted to coöperate with the tool-bar, substantially as set forth.

45. In an automatic carving machine, a reciprocating stock frame, head-chucks and tail-stocks for same adapted to hold pattern and stock, a device to rotate said head-chucks, a tool-bar adapted to be moved transversely across said stock frame, and a combined feed arrangement to be used either for rotating said head-chucks or for feeding said tool-bar, said feed arrangement having a member with means for an adjustable but predetermined division for a coarse feed for roughing and a fine feed for finishing the work, substantially as set forth 46. In a carving machine, rails to support the stock frame, a stock frame comprising two bars forming runners and fitting on said rails upon which they are adapted to slide, two cross bars, one of them fixed across the ends of the runners, the other adjustable on the latter, said cross bars being provided with screw threaded holes, studs and wedges for same to hold the stock or stock boards, substantially as set forth.

47. In a carving machine, a stock frame, two bars forming the principal members of the stock frame, one bar carrying head-chucks, the other tail-stocks, both bars being provided with screw threaded holes to receive bolts, wedges for said bolts, said bolts being provided with heads to receive said wedges, substantially for the purpose set forth.

48. In a carving machine, a stock frame, a number of tool carrying spindles, a corresponding number of stock boards, two or more bolts for each stock board, means to readily fasten said stock boards to said bolts, said bolts to be used as means to readily adjust the stock on the machine, substantially as set forth.

49. In a carving machine a stock frame adapted to carry a number of stock boards, said stock frame having two or more screw threaded holes for each stock board, a bolt for each hole, said bolt having a screw threaded part and a head, a wedge for said bolt, the head of the bolt being engaged by said wedge for the purpose set forth.

50. In an automatic carving machine, a tracer and cutting tools connected to act in unison, a reciprocating stock frame carrying pattern and stock, a retracting device having a friction cone, the latter carrying transmitting parts of smaller diameter, a flexible transmitter, said transmitting parts being connected to the tracer and cutting tools by said flexible transmitter, to increase the power of said friction cone, substantially as set forth.

51. In an automatic carving machine a tool-bar having tracer and cutting tools, a stock frame carrying pattern and stock, a retracting device having a constantly driven friction cup, a friction cone to match the same, a hollow stud forming the bearing for said friction members, a connecting member between said friction cone and tool-bar, controlling or carrying the tracer and tools, and a device to increase the pressure between said two friction members by pressure of projecting parts of the pattern against the tracer, on either the forward or rearward stroke of the stock frame, substantially as set forth.

52. In an automatic carving machine, a reciprocating stock frame, a stroke pattern carried by same, a tool-bar, means to feed said tool-bar across said stock frame, a reversing device for the stock frame and means containing a flexible member to connect said reversing device and tool-bar to act in conjunction with said stroke pattern, substantially as set forth.

53. In a carving machine means for carrying tracer and cutting tools, a horizontally disposed stock frame, devices to carry and adjust the stock and pattern on said stock frame, said devices and tracer and cutting tools being disposed along their carrying means, so as to leave an open space for the operator between the pattern and the stock, substantially as set forth.

54. In an automatic carving machine tracer and cutting tools, a retracting device for tracer and tools, having a rotating member, a second member capable of rotation, an adjustable brake for said second member, a device to increase or decrease the pressure between said second member with the rotating member, a bar carrying or controlling the tracer and cutting tools, and a transmitter between said second member and said bar, substantially as set forth.

55. In a carving machine a constantly rotating member for a retracting mechanism, a second member capable of rotation, a device to increase or decrease the pressure between the two aforesaid members, a connecting bar for said device, a tool-bar carrying tracer and cutting tools, and suitable couplings between said connecting bar and tool-bar, substantially as set forth.

56. In an automatic carving machine, a tool-bar carrying tracer and cutting tools, a reciprocating stock frame carrying pattern and stock, a retracting mechanism for said tool-bar, suitable bearings for said tool-bar, said tool-bar being adapted to a slight tilting motion in its bearings, to engage the retracting mechanism, and a device to hold tracer and tools in a position at right angles to the surface of said stock frame, and to resist the pressure of the stock against the cutting tools, said tracer and pattern adapted to tilt said tool bar, substantially as set forth.

57. In a carving machine, a reciprocating frame, means for holding pattern and stock in said frame, a tool-bar provided with tracer and cutting tool, a retracting device provided with a driving and a driven member, means for producing and controlling a constant initial frictional engagement of said members, means including said tracer for producing and controlling additional varying pressure to the driven member of said retracting device, and means to readily connect or disconnect said retracting device and tool-bar, substantially as set forth.

58. In a carving machine a tool bar provided with tracer and cutting tools, a connecting bar, one end of said connecting bar suitably connected to said tool-bar, and extending in a horizontal plane at right angles to the longitudinal axis thereof, a retracting device mounted on the frame of the machine, the other end of the said connecting bar being suitably connected to said retracting device, and a suitable transmitter connecting said tool-bar and retracting device, substantially as set forth.

59. In a carving machine a tool-bar provided with tracer and cutting tools, a connecting bar, one end of said connecting bar being suitably coupled to said tool-bar adjacent to the said tracer, a retracting device, the opposite end of said connecting bar being suitably coupled to said retracting device and a suitable transmitter connecting said tool-bar and retracting device, for the purpose set forth.

60. In an automatic carving machine, the combination with means to carry and feed the stock, and means to carry and control the tools, of a retracting device, comprising a constantly rotating friction cup, a friction cone, a hollow stud about which they rotate, a tilting lever, having an opening through one end, a movable plug adapted to engage in the said opening and provided at one end with a conical depression, a stationary plug having a conical depression normally located opposite to the conical depression in the said movable plug and axially alined therewith, a ball interposed between and engaged by the said conical depressions, and an adjustable spring located in said hollow stud adapted to normally hold the said plugs in engagement with the said ball, for the purpose set forth.

61. In an automatic carving machine, a reciprocating stock frame, a driving gear for said stock frame, a reversing device for said driving gear, a stroke pattern, and means to automatically operate said reversing device by said stroke pattern, for the purpose set forth.

62. In an automatic carving machine a reciprocating stock frame, a driving gear, a reversing device for said driving gear comprising a tilting lever, a connecting rod for said lever, an arm to connect to the free end of said connecting rod, springs and adjustable collars for said connecting rod, and retaining hooks to engage said collars and hold the tilting lever stationary during each stroke of the stock frame, substantially as set forth.

63. In a carving machine a stock frame, two bars forming the principal members of the stock frame, said bars being provided with screw threaded holes to receive bolts, wedges for said bolts, said bolts being provided with heads to receive said wedges, substantially for the purpose set forth.

64. In an automatic carving machine a retracting device, friction members and transmitting members for same, said transmitting members adapted to be of smaller diameter than said friction members, tracer and cutting tools, a bar to carry or control said tracer and cutting tools, and suitable connections between said transmitting members and said bar, substantially as set forth.

65. In an automatic carving machine in combination with pattern and work holding and feeding means, and means for carrying tracer and cutting tools, a stroke pattern, an automatic reversing device for the work and tool feeding means controlled by said stroke pattern, said pattern conforming to the outline or contour of the piece of work to be made, substantially as set forth.

66. In an automatic carving machine a stock frame, a driving gear, a reversing-device for said driving gear comprising a shaft, a tilting lever movably mounted on said shaft, an arm mounted near one end of said shaft, a clutch, a shifter for said clutch, and a device connecting the free ends of said arm and said shifter to operate said clutch and hold the latter in position during each stroke of the stock frame, substantially as set forth.

67. In an automatic carving machine, a stock frame provided with means to hold various kinds of stock, a tool-bar carrying tracer and cutting tools, a driving gear, a feed mechanism, suitable connections for the latter to be connected with the tool bar, or with the means for holding the stock, and a device for said feed mechanism to provide for a coarse feed for roughing and a fine feed for finishing the work, substantially as set forth.

68. In an automatic carving machine a reciprocating stock frame carrying pattern and stock, a bar carrying or controlling tracer and tools, retracting means for said tracer and tools including a driving and a driven friction member and a device to act upon said friction members by projecting parts of the pattern against the tracer, on either the forward or rearward stroke of the stock frame, substantially as set forth.

69. In a carving machine a bar or frame having devices to mount tracer and cutting tools, a horizontally disposed stock frame, devices to mount pattern and stock on said stock frame, said devices for mounting tracer and cutting tools and pattern and stock to be mounted so as to leave an open space for the operator between the pattern and stock, substantially as set forth.

70. In an automatic carving machine, means to rotate pattern and stock, means to carry or control tracer and cutting tools, feeding means including a feed adjusting gear, adjustable stops for same providing for a coarse feed for roughing and a fine feed for finishing, and means to connect said feeding means to the means for rotating pattern and stock, or to the means for carrying or controlling tracer and cutting tools, substantially as set forth.

71. In an automatic carving machine, a reciprocating stock frame, head-chucks and tail-stocks for same adapted to hold pattern and stock, a device to rotate said head-chucks, a tool bar adapted to be moved transversely across said stock frame, and a combined feed arrangement to be used either for rotating said head-chucks or for feeding said tool-bar, substantially as set forth.

72. In an automatic carving machine a tool-bar carrying or controlling tracer and cutting tools, a reciprocating stock frame, a second frame comprising means to carry said stock frame, means to reciprocate said stock frame, and means to adjust it toward or away from said tool bar to accommodate stocks of various thickness, substantially as set forth.

73. In an automatic carving machine a stock frame, a second frame comprising means to carry, means to raise and lower, and reciprocating means for said stock frame, and driving means including a variable-speed-drive, connected to said reciprocating means, substantially as set forth.

74. In an automatic carving machine, means to rotate pattern and stock in opposite directions, means to carry or control tracer and cutting tools, feeding means, comprising a device for fine or coarse feed, a device for continuous or interrupted feed, a device to feed in opposite directions, and means to connect said feeding means to rotate said pattern and stock, or to the means to carry or control said tracer and cutting tools, substantially as set forth.

75. In an automatic carving machine a stock frame, pattern and stock for same, means to carry and rotate pattern and stock, and feeding means connected thereto including loose pinions 127, 129, and change gears 126, 128, to accommodate various diameters of stock, substantially as set forth.

76. In a carving machine a stock frame, feeding means for said stock frame, tail-stocks for one member of said stock frame, said tail-stocks comprising part 134, shoe 135, nut 138, stud 139 and lock screw 140, substantially as set forth.

77. In a carving machine a stock frame, feeding means for said stock frame, head-chucks for one member of said stock frame, said head-chucks comprising spindle 110, bolt 111, chuck 113, nut 114 and worm wheel 115, substantially as set forth.

78. In an automatic carving machine a stock frame, a reciprocating device for said stock frame, a lock for said reciprocating device comprising rod 90, lever 89, collars 94, 94$^B$, springs 93—93', hooks 95, 95$^A$ and spring 97, substantially for the purpose set forth.

79. In an automatic carving machine a stock frame, a reciprocating device for said stock frame, a tool-bar carrying tracer and cutting tools and a device to connect said tool bar and reciprocating device, for the purpose set forth.

80. In an automatic carving machine a shifter plate, devices for said shifter plate to start and stop the machine, comprising bar 524, dogs 527, 527, foot plate 512, handle 513 and chain 503, end devices to change the machine to either automatic or hand operation, substantially as set forth.

81. In an automatic carving machine a feed mechanism including arm 239, collar 242, stud 243 and washer 248, substantially as set forth.

82. In an automatic carving machine a retracting device for tracer and cutting tools comprising two friction members, stud 361, screw-bolt 422, compression spring 407, plug 408, plug 397, bolt 400, and ball 404, substantially as set forth.

83. In an automatic and hand-feed carving machine a reciprocating tool carriage carrying tracer and cutting tools, a locking device for said tool carriage comprising lock-rod 281, lock 344, pivots 347, 347 and extension springs 349, 349, substantially as set forth.

84. In a carving machine a combined belt-guide and stretching device comprising carrier 301, bracket 306, idlers 311, 312, screw-bolt 321, and tension-spring 323, substantially as set forth.

85. In an automatic carving machine a feeding mechanism comprising shaft 54, loose-gear 156, bevel friction cone 158, coil spring 160, collar 161, feed-adjusting-gear 163, fingers 167, 170 and stop 180, substantially as set forth.

86. In an automatic carving machine a feeding mechanism comprising blade P, shaft 187, pinion 194, loose pinion 195, 203, pawls 198, 198, springs 199, 199, ratchet-wheels 202, 205 and shaft 206, substantially as set forth.

87. In an automatic carving machine, a tool bar carrying or controlling tracer and cutting tools, a stock frame carrying pattern and stock, and a device to hold the tracer and cutting tools in contact with pattern and stock under adjustable pressure, said device comprising tube 484, hand-screw 488, tube 489, pressure rod 112, an extension spring 491, substantially as set forth.

88. In an automatic carving machine a stock frame, a variable speed-drive for said stock frame comprising friction disk 23, fork 24, foot lever 26, shoe 28, and segment 30, substantially for the purpose set forth.

89. In an automatic carving machine a feed mechanism including gears 212, 227, collar 215, bell crank 218, feed screw 237, and a universal coupling between gear 227 and feed screw 237, substantially as set forth.

90. In a carving machine the frame F, supporting frame 3, including casing 53, bevel gear 50, pinions 57, 58, and shaft 47 carried by said casing, and means to adjust said supporting frame on said frame F, substantially as set forth.

91. In an automatic carving machine a stock frame, the frame F, a variable speed-drive for said stock frame, carried by said frame F, including shaft 15, friction disk 23, shaft 35, flanges 39, 40, bolts 41, 41, elastic disk 42, driving disk 34, worm 45, and worm wheel 46, substantially as set forth.

92. In a carving machine a tool bar controlling tracer and cutting tools, a counter balance for said tool bar comprising stem 433, balancing arm 438, adjustable weight 449, wheel 451, rollers 458, 459 and chain 160, substantially for the purpose set forth.

93. In an automatic carving machine, a stock frame provided with means to hold and rotate the stock, a tool bar carrying tracer and cutting tools, a driving gear, a feed mechanism, suitable connections for the latter to be connected with the tool bar, or with the means for holding and rotating the stock, substantially as set forth.

94. In an automatic carving machine, a stock frame, said stock frame carrying head-chucks and tail stocks, means to rotate said head-chucks, a driving gear for said stock frame, a feed mechanism interposed between said driving gear and the means for rotating said head-chucks, and means for said feed mechanism to provide continuous or interrupted feed to said head-chucks, substantially as set forth.

95. In an automatic carving machine, a tool carriage, a tool-bar, a retracting device, connecting means comprising rod 281 bar 389 and suitable connections for said rod 281 and said bar 389 to said tool bar and to said retracting device, substantially as set forth.

96. In a retracting mechanism for automatic carving machines suitable friction members, means for supplying a constant pressure between said friction members and means including a coil spring for additional varying pressure between said friction members.

97. In a retracting mechanism for automatic carving machines, a constantly rotating friction member, a second friction member, means supplying a constant pressure between said friction members, means to supply an additional varying pressure between said friction members, and means adapted to disengage the varying pressure but to retain the constant pressure between said friction members.

98. In an automatic carving machine tracer and cutting tools, connecting means for said tracer and cutting tools, a retracting device, comprising a driving and a driven member, and a flexible transmitter connecting said driven member and connecting means for said tracer and cutting tools, substantially as set forth.

99. In an automatic carving machine, a frame, tracer and cutting tools, a tool bar connecting said tracer and cutting tools, tilting means for said toolbar, a retracting device, and means to connect said tilting means to said retracting device, substantially as set forth.

100. In a combined automatic and hand carving machine, a combination feed mechanism for the tool bar and stock, means to disconnect said feed-mechanism from the tool bar for hand operation of the machine.

101. In a carving machine a tool bar, tracer and cutting tools for said tool bar, a stock-frame, pattern and stock for said stock-frame, means to operate said tool bar automatically, and means to operate said tool bar by hand on said pattern and stock.

In testimony whereof I affix my signature, in presence of two witnesses.

EMIL R. LOCHMAN.

Witnesses:
EMIL STAREK,
M. B. BELT.